United States Patent
Ohashi

(10) Patent No.: US 10,215,973 B2
(45) Date of Patent: *Feb. 26, 2019

(54) ZOOM LENS UNIT, IMAGING DEVICE, AND MONITORING VIDEO CAMERA

(71) Applicant: RICOH COMPANY, LTD, Tokyo (JP)

(72) Inventor: Kazuyasu Ohashi, Chiba (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/584,893

(22) Filed: May 2, 2017

(65) Prior Publication Data
US 2017/0235112 A1    Aug. 17, 2017

Related U.S. Application Data

(63) Continuation of application No. 14/637,932, filed on Mar. 4, 2015, now Pat. No. 9,671,597.

(30) Foreign Application Priority Data

Mar. 11, 2014 (JP) .................................. 2014-048250

(51) Int. Cl.
*G02B 15/17*     (2006.01)
*G02B 15/163*    (2006.01)
(Continued)

(52) U.S. Cl.
CPC ............. *G02B 15/17* (2013.01); *G02B 7/008* (2013.01); *G02B 7/028* (2013.01); *G02B 13/009* (2013.01);
(Continued)

(58) Field of Classification Search
CPC ...... G02B 15/163; G02B 15/24; G02B 15/26; G02B 15/28; G02B 15/14; G02B 15/15; G02B 15/17; G02B 15/173
(Continued)

(56) References Cited

U.S. PATENT DOCUMENTS 4,515,446 A    5/1985  Takahashi
4,626,076 A   12/1986  Oshima
(Continued)

FOREIGN PATENT DOCUMENTS

JP    2-126213 A    5/1990
JP    8-154758 A    7/1996
(Continued)

OTHER PUBLICATIONS

Office Action dated Nov. 17, 2017 in Japanese Patent Application No. 2014-048250.
(Continued)

*Primary Examiner* — Jordan Schwartz
(74) *Attorney, Agent, or Firm* — Oblon, McClelland, Maier & Neustadt, L.L.P.

(57) ABSTRACT

A zoom lens unit includes, in order from an object side to an image side, a first lens group having positive refractive power and a focus function, a second lens group having negative refractive power, which moves when changing a magnification, a third lens group which moves when changing a magnification, and a fourth lens group having positive refractive power, which is fixed when changing a magnification, wherein the following condition (1) is fulfilled:

$$|M_{2W} \cdot M_{3W} \cdot M_{4W}| < 0.14 \tag{1}$$

where $M_{2W}$ represents an imaging magnification of the second lens group at a wide-angle end, $M_{3W}$ represents an imaging magnification.the third lens group at the wide-angle end, and $M_{4W}$ represents an imaging magnification of the fourth lens group at the wide-angle end.

11 Claims, 13 Drawing Sheets

(51) Int. Cl.
*G02B 15/24* (2006.01)
*G02B 15/26* (2006.01)
*G02B 7/00* (2006.01)
*G02B 7/02* (2006.01)
*H04N 5/232* (2006.01)
*H04N 7/18* (2006.01)
*G02B 13/00* (2006.01)
*H04N 5/225* (2006.01)

(52) U.S. Cl.
CPC ........... *G02B 15/163* (2013.01); *G02B 15/24* (2013.01); *G02B 15/26* (2013.01); *H04N 5/2254* (2013.01); *H04N 5/23296* (2013.01); *H04N 7/18* (2013.01)

(58) Field of Classification Search
USPC .................................................. 359/687, 688
See application file for complete search history.

(56) References Cited

U.S. PATENT DOCUMENTS

| | | | |
|---|---|---|---|
| 5,706,138 A | 1/1998 | Abe et al. | |
| 5,831,771 A | 11/1998 | Suzuki | |
| 5,895,129 A | 4/1999 | Ohta | |
| 2005/0122595 A1 | 6/2005 | Nurishi | |
| 2005/0219709 A1* | 10/2005 | Wakazono | G02B 15/173 359/686 |
| 2006/0262422 A1 | 11/2006 | Ohashi | |
| 2007/0297068 A1 | 12/2007 | Ohashi | |
| 2008/0106799 A1 | 5/2008 | Ohashi | |
| 2008/0151385 A1 | 6/2008 | Ohashi | |
| 2008/0198477 A1 | 8/2008 | Ohashi | |
| 2008/0239504 A1 | 10/2008 | Tsutsumi | |
| 2009/0080088 A1 | 3/2009 | Ohashi | |
| 2009/0091841 A1 | 4/2009 | Ohashi | |
| 2009/0290230 A1 | 11/2009 | Wakazono et al. | |
| 2010/0007967 A1 | 1/2010 | Ohashi | |
| 2010/0027136 A1 | 2/2010 | Ohashi et al. | |
| 2010/0085647 A1* | 4/2010 | Nurishi | G02B 15/173 359/687 |
| 2010/0271710 A1 | 10/2010 | Ohashi | |
| 2011/0038055 A1 | 2/2011 | Nurishi | |
| 2011/0292522 A1 | 12/2011 | Kodaira | |
| 2011/0310496 A1 | 12/2011 | Kubota et al. | |
| 2011/0317280 A1 | 12/2011 | Saito | |
| 2011/0317285 A1 | 12/2011 | Ohashi et al. | |
| 2012/0212838 A1 | 8/2012 | Ohashi | |
| 2012/0314300 A1 | 12/2012 | Yamano | |
| 2013/0003189 A1 | 1/2013 | Sanjo et al. | |
| 2013/0194488 A1 | 8/2013 | Kubota et al. | |
| 2013/0194681 A1 | 8/2013 | Ohashi et al. | |
| 2013/0265649 A1 | 10/2013 | Ohashi | |
| 2013/0278814 A1* | 10/2013 | Yamasaki | G02B 15/14 348/345 |
| 2013/0321936 A1 | 12/2013 | Ohashi | |
| 2014/0016214 A1 | 1/2014 | Kubota et al. | |
| 2014/0078605 A1 | 3/2014 | Ohashi | |
| 2014/0126072 A1 | 5/2014 | Ohashi et al. | |
| 2014/0139932 A1 | 5/2014 | Ohashi | |
| 2014/0327972 A1 | 11/2014 | Yamano | |
| 2014/0340768 A1 | 11/2014 | Kubota et al. | |
| 2014/0347740 A1 | 11/2014 | Nagatoshi | |

FOREIGN PATENT DOCUMENTS

| | | |
|---|---|---|
| JP | 8-297244 | 11/1996 |
| JP | 9-61715 A | 3/1997 |
| JP | 2002-341243 | 11/2002 |
| JP | 3136804 U | 11/2007 |
| JP | 2008-241884 | 10/2008 |
| JP | 2009-232199 | 12/2009 |
| JP | 2009-282199 | 12/2009 |
| JP | 2011-248057 A | 12/2011 |
| JP | 2013-3336 | 1/2013 |
| JP | 2013-24936 | 2/2013 |
| JP | 2013-33242 | 2/2013 |
| JP | 2013-161005 | 8/2013 |
| WO | 2013/118471 A1 | 8/2013 |

OTHER PUBLICATIONS

Extended European Search Report issued in European Patent Application No. 15157629.5 dated Jul. 16, 2015.

* cited by examiner

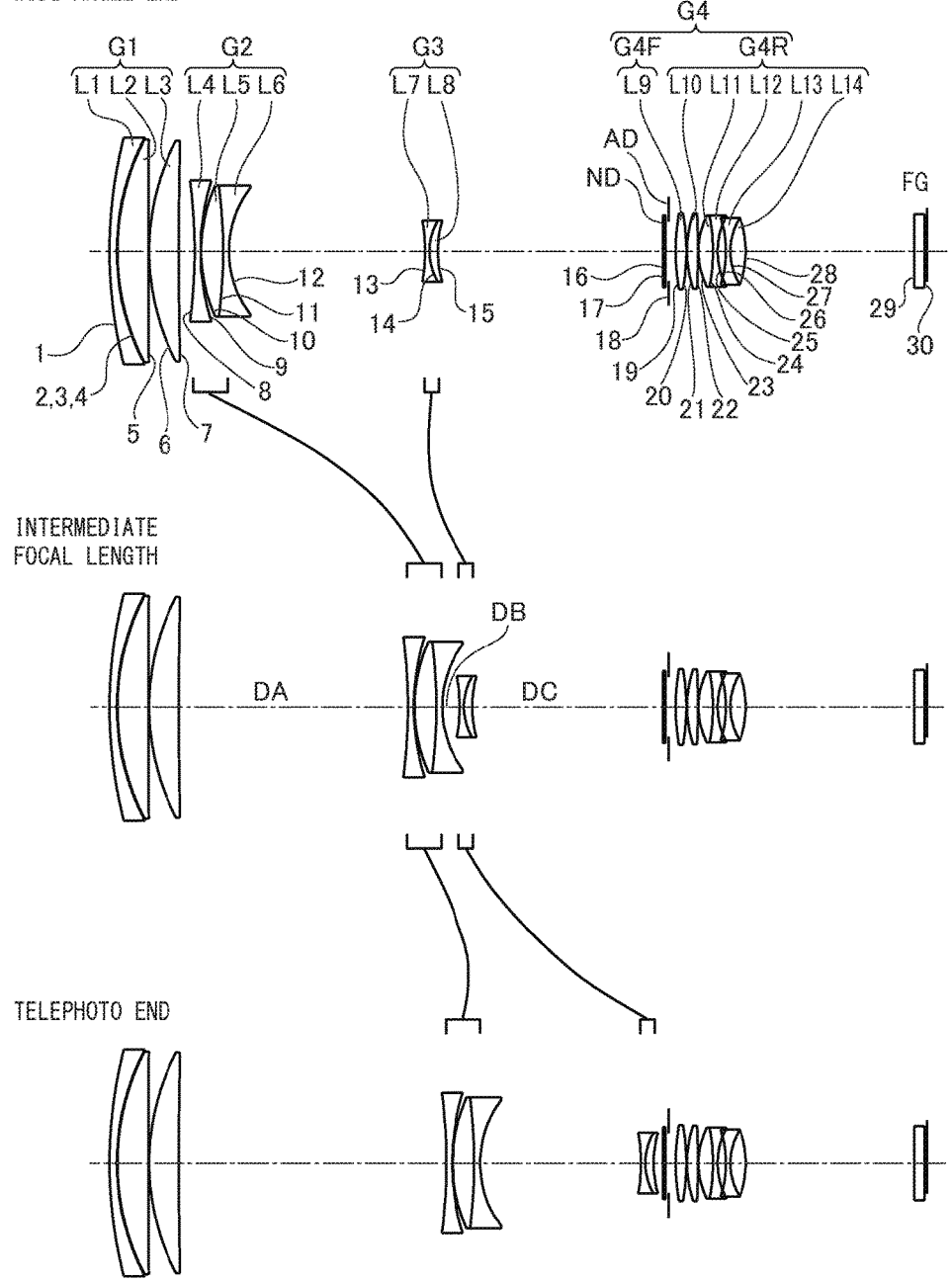

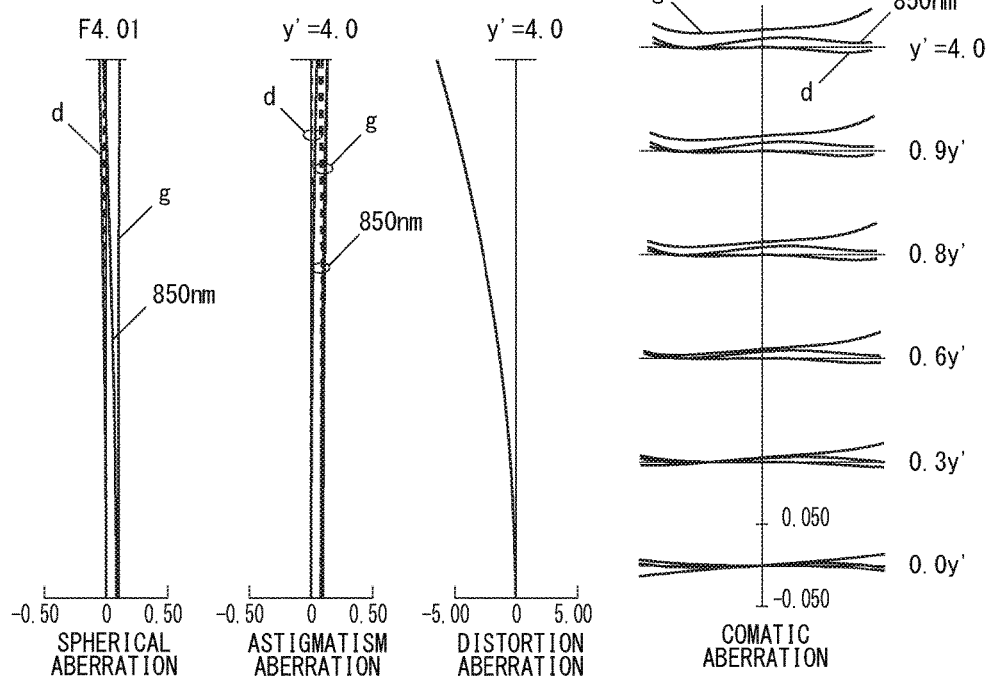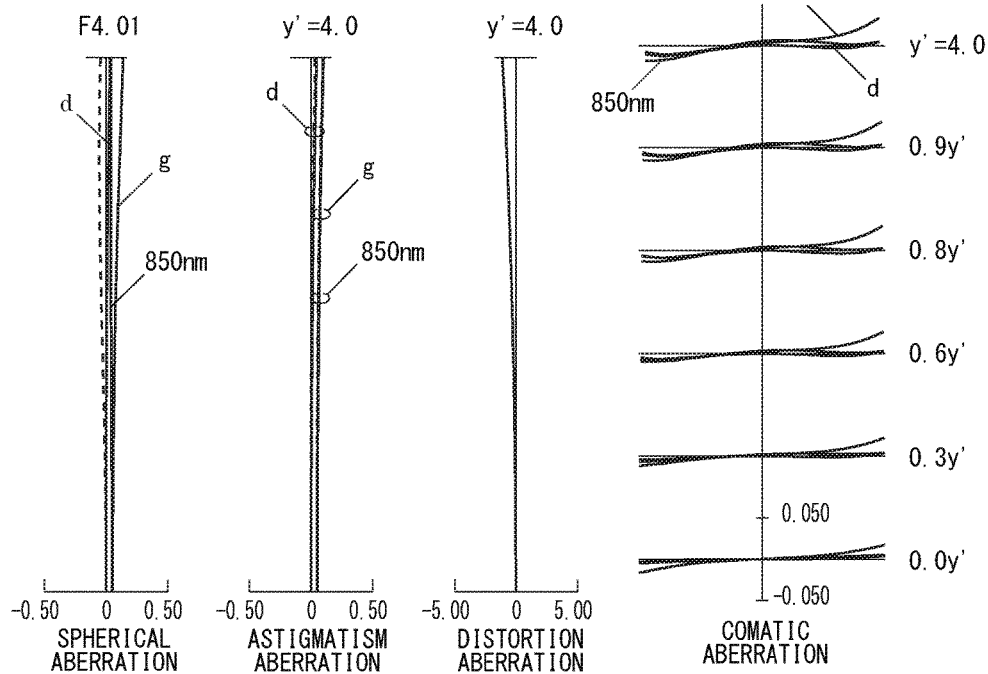

FIG.5
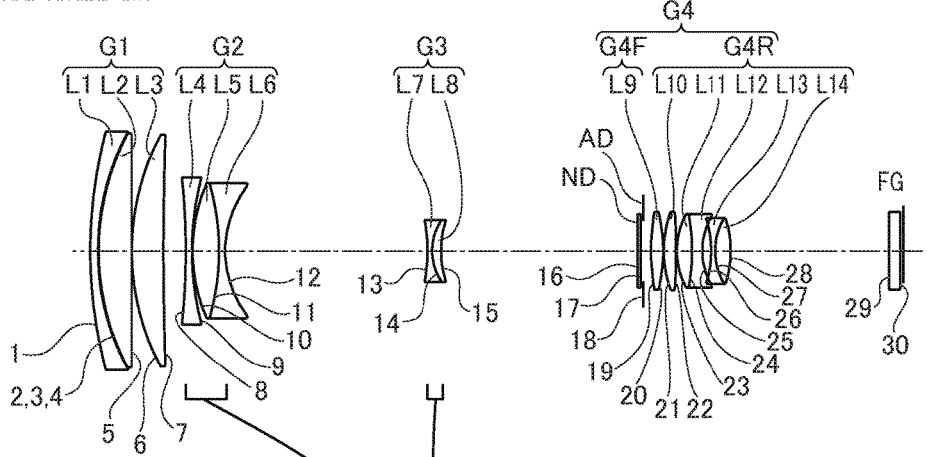
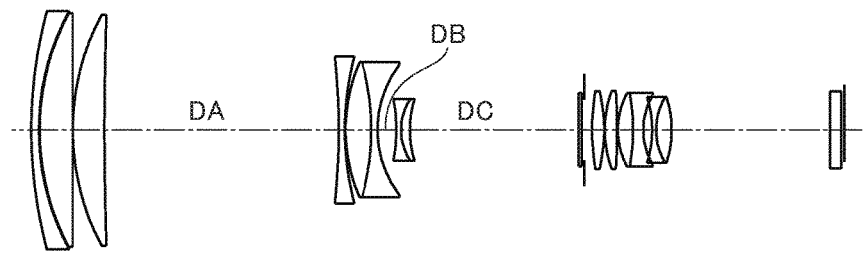
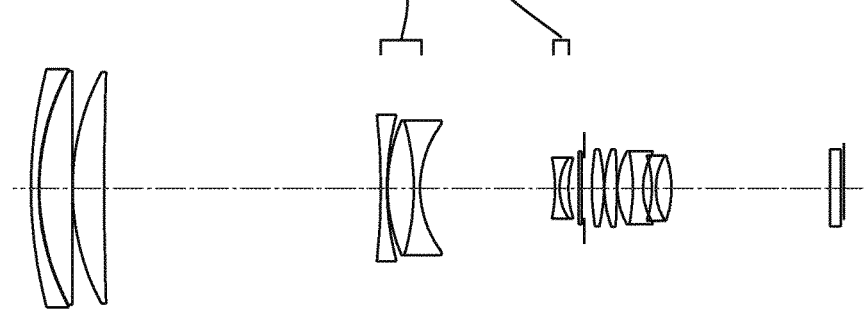

FIG.9
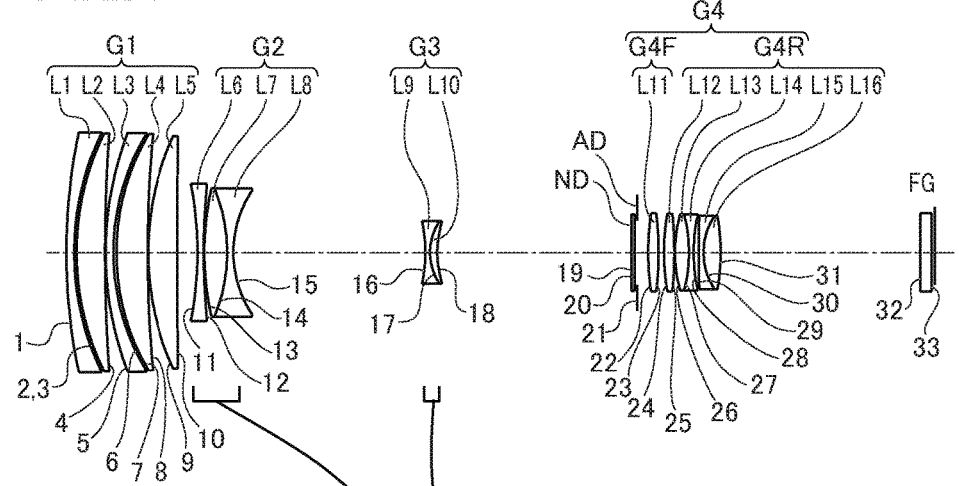
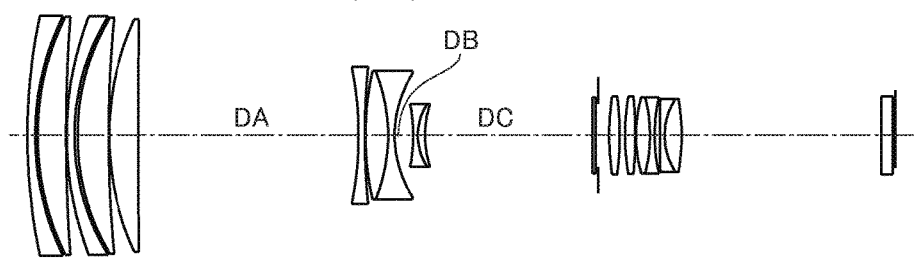
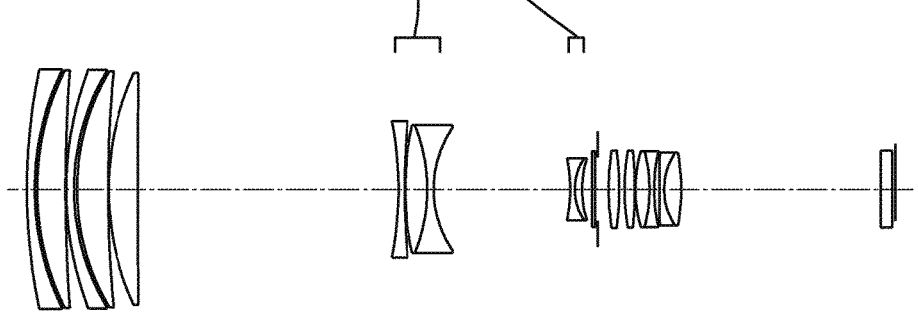

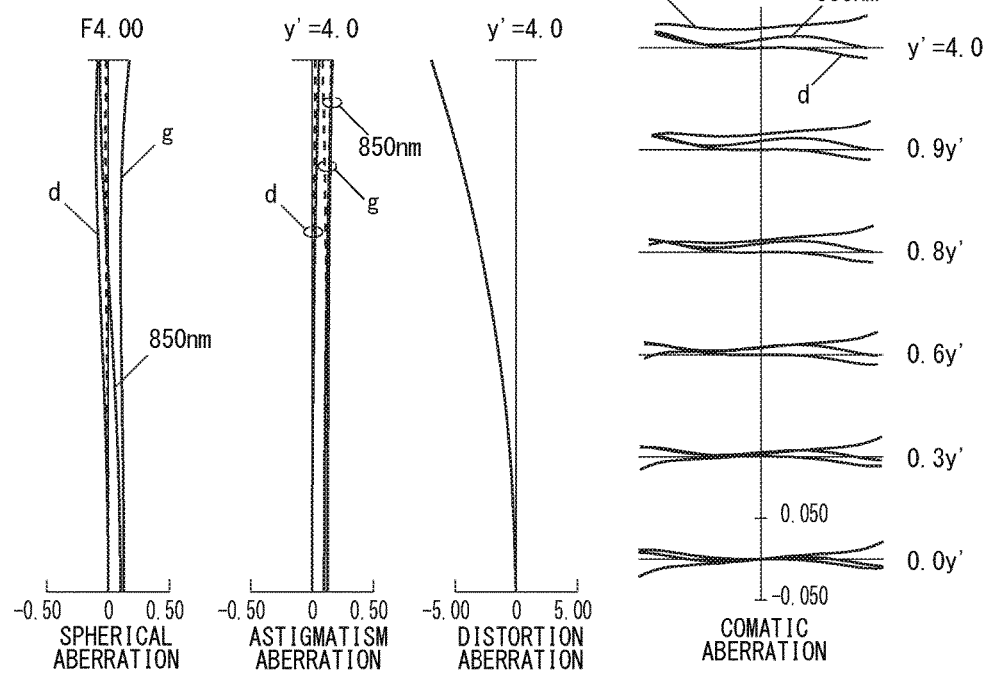
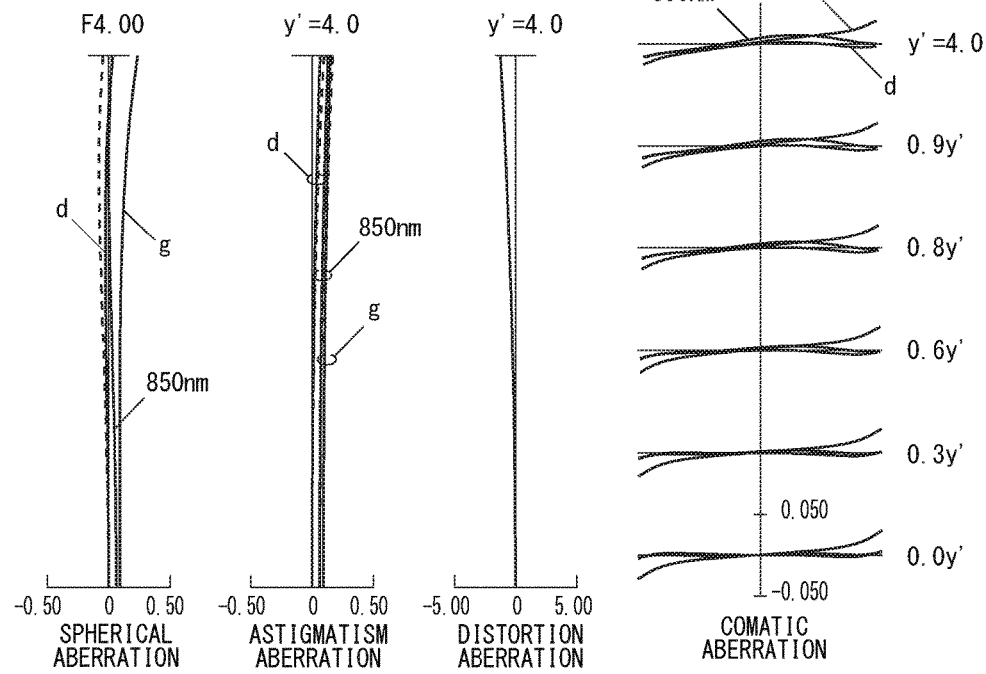

FIG.13
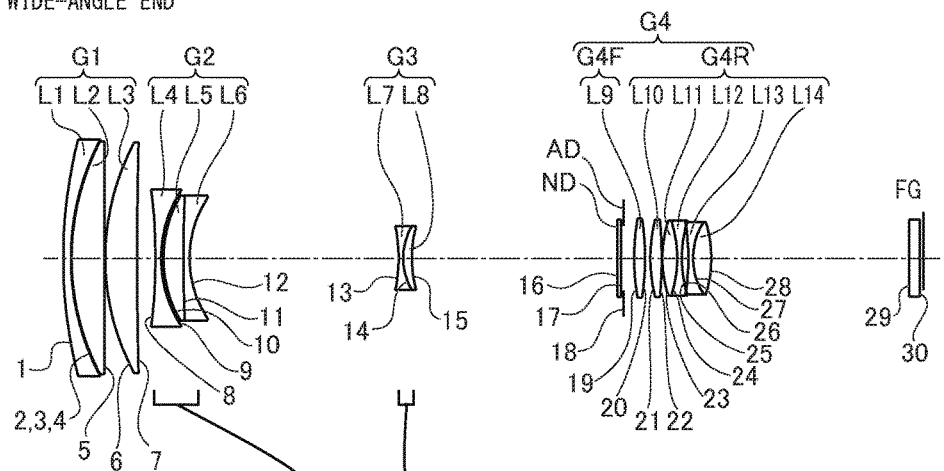
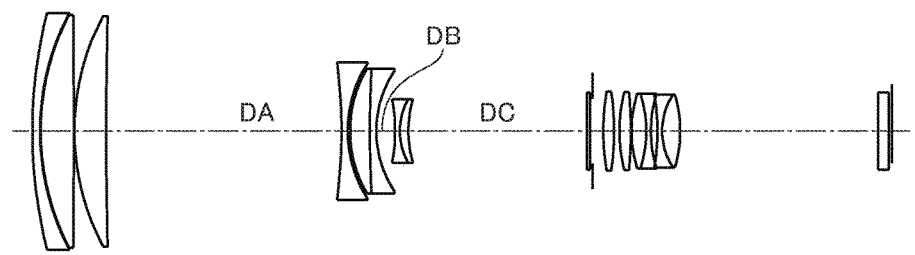
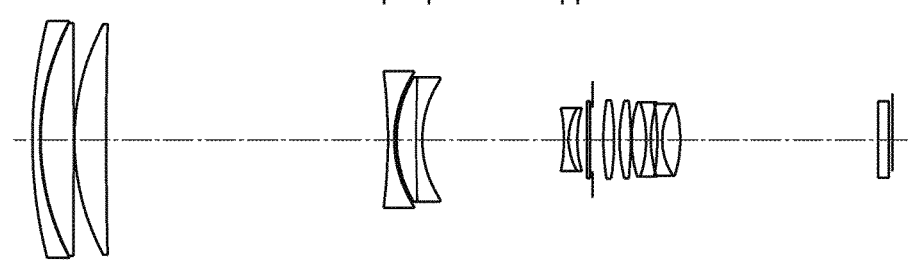

ZOOM LENS UNIT, IMAGING DEVICE, AND MONITORING VIDEO CAMERA

CROSS-REFERENCE TO RELATED APPLICATIONS

The present application is a continuation of Application Ser. No. 14/637,932 filed Mar. 4, 2015, which is based on and claims priority from Japanese Patent Application Number 2014-048250 filed Mar. 11, 2014, the entire contents of each of which are hereby incorporated by reference herein in their entirety.

BACKGROUND

Field of the Invention

The present invention relates to a lens unit including a zoom function which changes an angle of field by changing a focal length. In particular, the present invention relates to a zoom lens unit used for an imaging optical system in a TV camera, video camera, or so-called digital camera, which obtains image data of a subject, and which is especially suitable for a monitoring video camera. The present invention also relates to an imaging device using such a zoom lens unit as an imaging optical system.

Description of the Related Art

There are several types of zoom lens units for a TV camera. There is a zoom lens unit for a TV camera including a first lens group with positive refractive power, a second lens group with negative refractive power, which moves when changing a magnification, a third lens group which moves when changing a magnification, and a fourth lens group which is fixed when changing a magnification. In this type of zoom lens unit, the second lens group plays a role as variator lenses for changing a magnification and the third lens group plays a role as compensator lenses for correcting a change in image surface position with a change in magnification, or both of the second and third lens groups play roles of the variator lenses and compensator lenses. The first lens group includes a focus function, and the fourth lens group plays a leading role in imaging as a master group.

A monitoring TV camera or monitoring video camera performs imaging with sensitivity in a wavelength range including a near-infrared light range of about 900 nm or below. Such a monitoring TV camera or monitoring video camera is configured to obtain an accurate color image only with visible light by cutting near-infrared light during the day with a sufficient light volume, to obtain a light volume by transmitting all light from a visible light range to a near-infrared light range in bad weather or twilight, and to project or illuminate infrared light at a wavelength of about 850 nm toward a dark side during the night. The zoom lens unit used for a photographing lens unit is therefore required to have corrected chromatic aberration not only in a visible light range but also in a near-infrared light range. When the chromatic aberration is not corrected in the wavelength range including the near-infrared light range, the zoom lens unit is required to refocus on the occasion of switching between visible light and near-infrared light, and the zoom lens unit cannot obtain sufficient resolving power in a case where the zoom lens unit transmits all light from the visible light range to the near-infrared light range.

To preferably correct chromatic aberration in the above-described zoom lens unit, a method of reducing secondary spectrum with the use of a positive lens made of an anomalous low dispersion glass such as OHARA S-FPL51 or OHARA S-FPL53 in the first lens group having a high axial marginal light beam height on the telephoto side and in the fourth lens group having a high axial marginal light beam height on the wide-angle side. However, the anomalous low dispersion glass has a large negative temperature coefficient regarding a refractive index and a large positive linear expansion coefficient. For this reason, these large coefficients are added, refractive power as a lens significantly changes with a temperature change, and a change in imaging position (out of focus) of an entire optical system easily occurs.

JP H 08-297244A (Patent Literature 1), JP 2013-033242A (Patent Literature 2), and JP 2008-241884A (Patent Literature 3) describe the above-described zoom lens unit as a conventional example.

The zoom lens unit disclosed in Patent Literature 1 is configured to control a change in imaging position with a temperature change by devising the material of the negative lens in a lens unit in addition to a focus lens unit while using a positive lens made of an anomalous low dispersion glass in the lens unit. However, such a zoom lens unit is not sufficient as a monitoring zoom lens unit since the chromatic aberration is not corrected in a wavelength range including a near-infrared light range.

The zoom lens unit disclosed in Patent Literature 2 is configured to control out of focus of an optical system with a temperature change by devising the configuration of the fourth lens group, and/or the material and the refractive power of respective lenses in the third lens group. However, such a zoom lens unit requires an impractical material as a normal optical glass. Such a zoom lens unit is not sufficient as a monitoring zoom lens unit since the chromatic aberration is not corrected in a wavelength range including a near-infrared light range.

The zoom lens unit disclosed in Patent Literature 3 is configured to correct the chromatic aberration in a wavelength range including a near-infrared light range with the use of an anomalous low dispersion glass in the first and fourth lens groups. However the zoom lens unit is not configured to control a change in imaging position with a temperature change.

SUMMARY

On the other hand, in the above-described zoom lens unit, the focus sensitivity (displacement of image surface when the first lens group moves at unit amount) when focusing with the first lens group significantly differs between the wide-angle end and the telephoto end in accordance with a rise in magnification. A change in magnification of a zoom lens unit corresponds to a change in lateral magnification in which all of lens groups after the second lens group are combined. Since the above sensitivity is proportional to the square of the lateral magnification (= longitudinal magnification), the focus sensitivity at the wide-angle end and the telephoto end differs 900 times when the magnification is 30 times, for example.

In this case, when a change in imaging position (out of focus) with a temperature change occurs, such a change in imaging position can be easily absorbed by refocusing with the first lens group having a focus function at the telephoto end where the sensitivity of the first lens group is high. However, such a change cannot be sufficiently absorbed at the wide-angle end in which the sensitivity of the first lens group is very low even when the first lens group is moved up to the limit of the mechanical configuration. That is, the problem to correct the change in imaging position (out of focus) with a temperature change is more important at the wide-angle end than the telephoto end.

To solve the above problems, it is an object of the present invention to provide a zoom lens unit which has a high magnification and resolving power compatible with a high quality imaging element, and further enables correction of chromatic aberration from a visible light range to a near-infrared light range and enables correction of a change in focus position with a temperature change especially in a wide-angle range.

To achieve the above object, an aspect of the present invention provides a zoom lens unit including, in order from an object side to an image side; a first lens group having positive refractive power and a focus function; a second lens group having negative refractive power, which moves when changing a magnification; a third lens group which moves when changing a magnification; and a fourth lens group having positive refractive power, which is fixed when changing a magnification, wherein the following condition (1) is fulfilled:

$$|M_{2W} \cdot M_{3W} \cdot M_{4W}| < 0.14 \quad (1)$$

where $M_{2W}$ represents an imaging magnification of the second lens group at a wide-angle end, $M_{3W}$ represents an imaging magnification of the third lens group at the wide-angle end, and $M_{4W}$ represents an imaging magnification of the fourth lens group at the wide-angle end, and a change in focus position with a temperature change is corrected by moving an entire or a part of the fourth lens group at least at the wide-angle end.

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

FIG. 1 is a cross-sectional view illustrating an arrangement of an optical system (lenses) at a wide-angle end (short focal length end), intermediate focal length, and telephoto end (long focal length end) of a zoom lens unit according to Embodiment 1.

FIG. 2 shows graphs illustrating curves of spherical aberration, astigmatism aberration, distortion aberration, and coma aberration at the wide-angle end of the zoom lens unit according to Embodiment 1 illustrated in FIG. 1.

FIG. 3 shows graphs illustrating curves of spherical aberration, astigmatism aberration, distortion aberration, and coma aberration at the intermediate focal length of the zoom lens unit according to Embodiment 1 illustrated in FIG. 1.

FIG. 5 is a cross-sectional view illustrating an arrangement of an optical system at a wide-angle end, intermediate focal length, and telephoto end of a zoom lens unit according to Embodiment 2.

FIG. 9 is a cross-sectional view illustrating an arrangement of an optical system at a wide-angle end, intermediate focal length, and telephoto end of a zoom lens unit according to Embodiment 3.

FIG. 10 shows graphs illustrating curves of spherical aberration, astigmatism aberration, distortion aberration, and coma aberration at the wide-angle end of the zoom lens unit according to Embodiment 3 illustrated in FIG. 9.

FIG. 11 shows graphs illustrating curves of spherical aberration, astigmatism aberration, distortion aberration, and coma aberration at the intermediate focal length of the zoom lens unit according to Embodiment 3 illustrated in FIG. 9.

FIG. 13 is a cross-sectional view illustrating an arrangement of an optical system at a wide-angle end, intermediate focal length, and telephoto end of a zoom lens unit according to Embodiment 4.

DETAILED DESCRIPTION OF THE PREFERRED EMBODIMENTS

Figure 4:
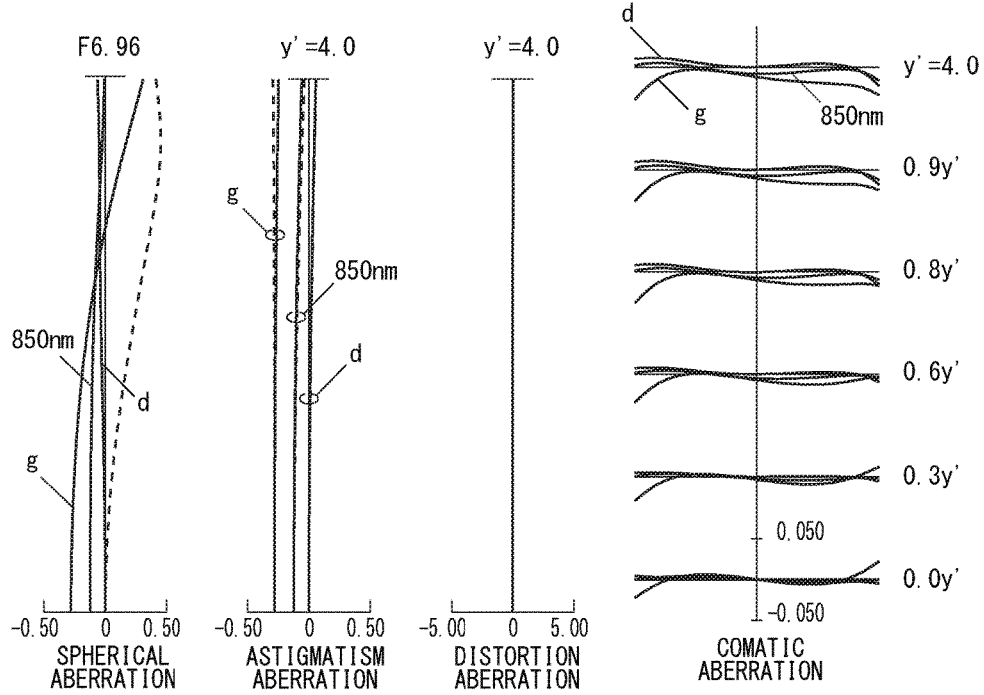
FIG. 4 shows graphs illustrating curves of spherical aberration, astigmatism aberration, distortion aberration, and coma aberration at the telephoto end of the zoom lens unit according to Embodiment 1 illustrated in FIG. 1.

Hereinafter, a zoom lens unit according to embodiments of the present invention will be described with reference to the drawings. Prior to describing specific embodiments, the features of the zoom lens unit according to the embodiments are described herewith.

A zoom lens unit according to the present invention includes, in order from an object side to an image side, a first lens group having positive refractive power and a focus function, a second lens group having negative refractive power, which moves when changing a magnification, a third lens group which moves when changing a magnification, and a fourth lens group having positive refractive power, which is fixed when changing a magnification. The second lens group is configured as variator lenses which play a leading role in changing a magnification, and the third lens group is also configured to share the role of changing a magnification. The zoom lens unit is thus suitable for a high magnification.

Since the first lens group includes the focus function, a change in focus position does not occur even when zooming is carried out in a focused state on a finite distance, and it is not necessary to refocus. The usability of the zoom lens unit can be therefore improved.

It is preferable for the zoom lens unit to fulfill the following condition (1), and to correct a change in focus position with a temperature change by moving the entire or a part of the fourth lens group at least at the wide-angle end:

$$|M_{2W} \cdot M_{3W} \cdot M_{4W}| < 0.14 \quad (1)$$

where $M_{2W}$ represents an imaging magnification of the second lens group at the wide-angle end, $M_{3W}$ represents an imaging magnification of the third lens group at the wide-angle end, and $M_{4W}$ represents aging magnification of the fourth lens group at the wide-and e end.

$|M_{2W} \cdot M_{3W} \cdot M_{4W}|$ represents an absolute value of a lateral magnification in which all lens groups after the second lens group at the wide-angle end are combined. The focus sensitivity (displacement of image surface when the first lens group moves at unit amount) when focusing with the first lens group is proportional to the square (= longitudinal magnification) of the lateral magnification. When the absolute value is less than 0.14, the sensitivity is less than 0.02. For example, when a change in imaging position (out of focus) with a temperature change is 0.2 mm, a displacement of the first lens group required for correcting the change exceeds 10 mm. The zoom lens unit which fulfills the condition (1) therefore has a problem in that correction (refocus) of the imaging position by the movement of the first lens group at the wide-angle end cannot be expected.

Therefore, the entire or a part of the fourth lens group plays a role in correcting a change in focus position with a temperature change at least at the wide-angle end. It is of course possible for the entire or a part of the second lens group and the third lens group to play a role similar to that of the fourth lens group. However, the second lens group and the third lens group are lens groups which move when changing a magnification. When the role of correcting a change in focus position with a temperature change is added to the second and third lens groups, the second and third lens groups include two moving mechanisms, resulting in a complex configuration. On the other hand, since the entire or a part of the fourth lens group is a lens group which does not move when changing a magnification, the mechanism for the movement with a temperature change can be simplified.

The change in focus position with a temperature change at the wide-angle end is mostly caused by the fourth lens group. That is, since errors in the fourth lens group are corrected by the fourth lens group itself, the errors are directly corrected. The errors in the correction thus hardly occur compared to a case in which the errors are corrected by another lens group.

When the zoom lens unit is configured as described above to correct the change in focus position with a temperature change by moving the entire or a part of the fourth lens group, the glass in a lens design can be selected according to the temperature correction without a limitation, and the chromatic aberration can be sufficiently corrected from the visible light range to the near-infrared light range by reducing a secondary spectrum. Such a zoom lens unit is advantageous in that it does not unnecessarily complicate the mechanism.

Additionally, the lower limit of the condition (1) is about 0.01. When $|M_{2W} \cdot M_{3W} \cdot M_{4W}|$ is smaller than 0.01, it is not a preferable condition. With this condition, sensitivity when focusing with the first lens group at the telephoto end lowers even if the magnification is about 20 to 100 times.

It is preferable for the zoom lens unit to correct a change in focus position with a temperature change by moving the entire fourth lens group, and it is preferable for the zoom lens unit to fulfill the following condition (2):

$$0.3 < |1 - M_{4W}^2| < 1.5 \quad (2)$$

where $M_{4W}$ represents an imaging magnification of the fourth lens group at the wide-angle end.

When the change in focus position with a temperature change is corrected by moving the entire fourth lens group, the fourth lens group originally designed as an individual lens group has an advantage in that influence on an imaging performance due to axis shift with another lens group, inclination, or the like is inevitably small. That is, since the required accuracy of the moving mechanism of the fourth lens group relatively lowers, the mechanism can be simplified or the costs of the mechanism can be lowered.

In this case, when $|1-M_{4W}^2|$ in the condition (2) is equal to 0.3 of a lower limit or below, it is not a preferable condition. With this condition, a displacement of the fourth lens group for correcting a change in focus position excessively increases relative to the change in focus position, it becomes necessary to previously ensure a space for the displacement of the fourth lens group, and a change in various aberration caused by the displacement easily occurs. On the other hand, when $|1-M_{4W}^2|$ in the condition (2) is equal to 1.5 of an upper limit or above, it is not a preferable condition. With this condition, a displacement of the fourth lens group for correcting a change in focus position excessively decreases relative to the change in focus position, and the moving accuracy is excessively required.

It is preferable for the fourth lens group to include, in order from the object side, a fourth front lens group and a fourth latter lens group, to correct a change in focus position with a temperature change by moving the fourth front lens group, and to fulfill the following condition (3):

$$0.3 < |(1-M_{4FW}^2) \cdot M_{RW}^2| < 1.5 \quad (3)$$

where $M_{4FW}$ represents an imaging magnification of the fourth front lens group at the wide-angle end and $M_{4RW}$ represents an imaging magnification of the fourth latter lens group at the wide-angle end.

When a change in focus position with a temperature change is corrected by moving the fourth front lens group, it is advantageous in that the volume and mass of a moving part can be decreased, an actuator for moving can be downsized, and costs can be lowered compared to a case in which such a change in focus position is corrected by moving the entire fourth lens group.

In this case, when $|(1-M_{4FW}^2) \cdot M_{4RW}^2|$ is equal to 0.3 of a lower limit or below, it is not a preferable condition. With this condition, a displacement of the fourth lens group for correcting a change in focus position excessively increases relative to the change in focus position, it becomes necessary to previously ensure a space for the displacement of the fourth lens group, and a change in various aberration caused by the displacement easily occurs. On the other hand, when $|(1-M_{4FW}^2) \cdot M_{4RW}^2|$ is equal to 1.5 of an upper limit or above, it is not a preferable condition. With this condition, the displacement of the fourth lens group for correcting the change in focus position excessively decreases relative to the change in focus position, and the moving accuracy is excessively required.

It is preferable for the fourth lens group to include, in order from the object side, the fourth front lens group and the fourth latter lens group, to correct the change in focus position with a temperature change by moving the fourth latter lens group, and to fulfill the following condition (4):

$$0.3 < |1 - M_{4RW}^2| < 1.5 \tag{4}$$

where $M_{4RW}$ represents an imaging magnification of the fourth latter lens group at the wide-angle end.

When the change in focus position with a temperature change is corrected by moving the fourth latter lens group, it is advantageous in that the volume and the mass of a moving portion can be decreased, an actuator for moving can be downsized, and the costs can be lowered compared to a case in which the change in focus positon is corrected by moving the entire fourth lens group. It is more preferable to use the fourth latter lens group than the fourth front lens group since a space can be easily obtained around the fourth latter lens group, and the moving mechanism can be easily configured.

In this case, when $|1-M_{4RW}^2|$ in the condition (4) is equal to 0.3 of a lower limit or below, it is not a preferable condition. With this condition, the displacement of the fourth lens group for correcting the change in focus position excessively increases relative to the change in focus position, it becomes necessary to previously ensure a space for the displacement of the fourth lens group, and a change in various aberration caused by the displacement easily occurs.

On the other hand, when $|1-M_{4RW}^2|$ in the condition (4) is equal to 1.5 of an upper limit or above, it is not a preferable condition. With this condition, the displacement of the fourth lens group for correcting a change in focus positon excessively decreases, and the moving accuracy is excessively required.

It is preferable for the fourth lens group to include a plurality of positive lenses which fulfill the following conditions (5), (6):

$$\alpha > 110 \times 10^{-7}/°\,C. \tag{5}$$

$$dn/dt < -4 \times 10^{-6}/°\,C. \tag{6}$$

where $\alpha$ represents a linear expansion coefficient of a lens material in a normal temperature range including 20° C., and dn/dt represents a temperature coefficient of a relative refractive index of a lens material in a range from 20° C. to 40° C.

To correct the chromatic aberration at the wide-angle end, it is necessary for the fourth lens group to use a positive lens made of a material having a dispersion property different from a normal property, such as an anomalous low dispersion glass. However, since such a material generally has a large negative temperature coefficient regarding refractive index and a large positive linear expansion coefficient, its refractive power significantly changes as a lens with a temperature change, and it easily causes a change in imaging position (out of focus) as the entire optical system. However, when the zoom lens unit is configured such that the change in focus position with a temperature change is corrected by moving the entire or a part of the fourth lens group, the material can be selected in favor of the correction of the chromatic aberration without considering the above property.

When the fourth lens group includes only a positive lens made of a material in which $\alpha$ in the condition (5) is equal to $110 \times 10^{-7}/°$ C. or below, or dn/dt in the condition (6) is $-4 \times 10^{-6}/°$ C. or above, the degree of freedom of the correction of the chromatic aberration at the wide-angle end is disturbed, and it becomes difficult to sufficiently correct the chromatic aberration from the visible light range to the near-infrared light range.

It is more preferable for the zoom lens unit to satisfy the following conditions (5)', (6)'.

$$110 \times 10^{-7}/°\,C. < \alpha < 300 \times 10^{-7}/°\,C. \tag{5}'$$

$$-20 \times 10^{-6}/°\,C. < dn/dt < -4 \times 10^{-6}/°\,C. \tag{6}'$$

It is preferable for the fourth lens group to include, in order from the object side, at least three positive lenses, and it is also preferable for the three positive lenses to satisfy the following conditions (7), (8):

$$75 < \nu_d < 98 \tag{7}$$

$$\theta_{C,A'} < 0.000667 \cdot \nu_d + 0.300 \tag{8}$$

where $\nu_d$ represents Abbe number of a lens material, and $\theta_{C,A'}$ represents a partial dispersion ratio of a lens material.

In this case, $\theta_{C,A'} = (n_C - n_{A'})/(n_F - n_C)$, $n_F$, $n_C$, $n_{A'}$ are refractive indexes to F-line, C-line and A'-line of a lens material, respectively.

It is preferable for the fourth lens group to include, in order from the object side, three positive lenses, and for the three positive lenses to be made of a material which fulfills the conditions (7), (8). With this, the chromatic aberration in a wavelength range including the near-infrared light range can be further preferably corrected in the wide-angle range of the zoom range.

It is preferable for a plurality of positive lenses which fulfills the conditions (5), (6) of the temperature coefficient of the relative refractive index and the linear expansion coefficient to include three positive lenses which fulfill the conditions (7), (8) of the partial dispersion ratio and the Abbe number.

Namely, when the change in focus position with a temperature change is corrected by moving the entire or a part of the fourth lens group, the configuration of the fourth lens group can be easily optimized for correcting the chromatic aberration.

It is preferable for the arrangement of the fourth lens group to fulfil the following condition (9):

$$0.2 < L_4/T_{4F-I} < 0.5 \tag{9}$$

where $L_4$ represents a distance from the most object side surface to the most image side surface in the fourth lens group along the optical axis, and $T_{4F-I}$ represents a distance from the most object side surface of the fourth lens group to the image surface along the optical axis. When an optical element without having refractive power is provided on the image side of the fourth lens group, $T_{4F-I}$ represents an air conversion length assuming that there is no optical element.

When $L_4/T_{4F-I}$ in the condition (9) is 0.2 or below, the degree of freedom regarding the configuration of the fourth lens group is disturbed, and it may become difficult to correct various aberration.

On the other hand, when $L_4/T_{4F-I}$ is equal to 0.5 or above, it is not a preferable condition. With this condition, a sufficient space cannot be ensured between the fourth lens group and the image surface, it becomes difficult to dispose a switching mechanism such as an infrared light cut filter or a visible light cut filter, and ghost by the reflection of the filter or various surfaces in the fourth lens group easily occurs. Additionally, the volume and weight of the fourth lens group increase, the size of the actuator for moving increases, and the power consumption also increases.

It is more preferable for the zoom lens unit to fulfill the following condition (9)'.

$$0.2 < L_4/T_{4F-I} < 0.4 \tag{9}'$$

It is preferable for the fourth lens group to be i lade of six lenses including, in order from the object side, a first positive lens, a second positive lens, a third positive lens, a first negative lens, a second negative lens, and a fourth positive lens.

Since the fourth lens group generally includes an aperture stop near the most object side, the fourth lens group plays a role in correcting the axial aberration mainly in the object side portion and also plays a role in correcting the off-axis aberration mainly in the image side portion. According to the above configuration, the axial aberration such as spherical aberration and axial chromatic aberration and the off-axis aberration such as astigmatism aberration, coma aberration and magnification chromatic aberration can be sufficiently reduced with a good balance.

When the change in focus position with a temperature change is corrected by moving the fourth front lens group or the fourth latter lens group, the fourth front lens group consists of the first positive lens, and the fourth latter lens group is made of five lenses from the second positive lens to the fourth positive lens.

When the fourth lens group is divided between the first positive lens and the second positive lens, the first positive lens, the second positive lens, and the third positive lens share a role of correcting aberration. With this configuration, an influence on the imaging performance when relative axis shift or inclination occurs between the two groups (fourth front lens group and fourth latter lens group) can be relatively lowered.

When the change in focus position with a temperature change is corrected by moving the fourth front lens group, only one lens is moved. It is advantageous in that the weight of the zoom lens unit can be reduced.

With this, various objects of the present invention are achieved. A further desirable embodiment will be described with reference to the drawings.

The first lens group G1 includes, in order from the object side to the image side, a first lens L1 made of a negative meniscus lens having a concave surface on the image side, a second lens L2 made of a positive lens having a convex surface on the object side, an absolute value of a curvature radius on the object side surface being smaller than that on the image side surface, and a third lens L3 made of a positive lens having a convex surface on the object side, an absolute value of a curvature radius on the object side surface being smaller than that on the image side surface. The first lens group G1 includes a diffractive-optical element.

When a high magnification and a long focal length especially at the telephoto end are obtained, it becomes difficult to correct a secondary spectrum of axial chromatic aberration on the telephoto side. When the chromatic aberration is corrected not only in the visible light range but also in the near-infrared light range, the correction of the secondary spectrum becomes more difficult. The configuration of the first lens group G1 in which the height of the axial marginal light beam is high on the telephoto side is important for correcting the axial chromatic aberration in the telephoto range.

With the configuration in which the first lens group includes the diffractive-optical element, even when the chromatic aberration in the telephoto range including a near-infrared light range is sufficiently corrected, the number of lenses in the first lens group having a large diameter can be controlled to three, and the weight the first lens group is thus reduced. It is preferable for the zoom lens unit to fulfill the following condition (10) when the first lens group includes the diffractive-optical element:

$$0.01 < f_T/f_{DOE} < 0.05 \tag{10}$$

where $f_T$ represents an entire focal length at the telephoto end, and $f_{DOE}$ represents a focal length of the diffraction portion of the diffractive-optical element.

When the refractive power of the diffractive-optical element is weak such that $f_T/f_{DOE}$ in the condition (10) is equal to 0.01 or below, it becomes difficult to sufficiently correct the chromatic aberration in the telephoto range. On the other hand, when the refractive power of the diffractive-optical element is strong such that $f_T/f_{DOE}$ in the condition (10) is equal to 0.05 or above, it is not a preferable condition. With this condition, the chromatic aberration on the telephoto side is excessively corrected.

The first lens group G1 may include, in order from the object side, five lenses of a negative meniscus lens having a concave surface on the image side, a positive lens having a convex surface on the object side, an absolute value of a curvature radius on the object side surface being smaller than that on the image side surface, a negative meniscus lens having a concave surface on the image side, a positive lens having a convex surface on the object side, an absolute value of a curvature radius on the object side surface being smaller than that on the image side surface, and a positive lens having a convex surface on the object side, an absolute value of a curvature radius on the object side surface being smaller than that on the image side surface.

In this case, it becomes unnecessary to provide the diffractive-optical element in the first lens group G1, and also to consider unnecessary order diffraction light due to the wavelength dependency of the diffractive-optical element, and a flare caused by the structure of the diffractive-optical element.

It is preferable for the first lens group G1 to be fixed to the image surface when changing a magnification.

It is desirable for a zoom lens unit for a TV camera or a video camera to have a constant entire length and an unchanged weight balance when changing a magnification. Such a zoom lens unit can be achieved with the configuration which does not move the first lens group G1. Moreover, the small number of moving groups is advantageous in terms of a mechanical aspect, and leads to reduction in the number of components and in component weight, and improvement in reliability.

It is preferable for the positive lens in the first lens group G1 to fulfill the following condition (11):

$$75 < v_{1GP} < 96 \tag{11}$$

where $v_{1GP}$ represents an average value of Abbe number of a material of a positive lens in the first lens group G1.

When $v_{1GP}$ in the condition (11) is equal to 75 or below, the chromatic aberration in the telephoto range is not sufficiently corrected. On the other hand, there is a no material in which $v_{1GP}$ is equal to 96 or above. Even if there is such a material, it is not realistic because it is very special and expensive. In addition, even when another chromatic aberration corrector, for example, a diffractive-optical element in the first lens group G1 is used, it is preferable to fulfill the condition (11) when high-level chromatic aberration correction in a wavelength range including a near-infrared light range is required.

It is more preferable for the zoom lens unit to fulfill the following condition (11)'.

$$80 < v_{1GP} < 96 \tag{11)'}$$

It is preferable for at least one of the positive lenses in the first lens group G1 to fulfill the following conditions (7), (8):

$$75 < v_d < 96 \tag{7}$$

$$\theta_{O,A} < 0.000667 \cdot v_d + 0.300 \tag{8}$$

where $v_d$ represents Abbe number of the material constituting the positive lens, and $\theta_{C, A'}$ represents a partial dispersion ratio of a material constituting the positive lens.

In this case, $\theta_{C, A'} = (n_C - n_{A'})/(n_F - n_C)$, and $n_F$, $n_C$, $n_{A'}$ are refractive indexes to F-line, C-line, and A'-line of a material constituting the negative lens, respectively.

It becomes possible to further preferably correct the chromatic aberration in the wavelength range including the near-infrared light range in a telephoto range of a zoom range by providing the positive lens to fulfill the above conditions in the first lens group G1.

It is preferable for the refractive power of each lens group to fulfill each of the following conditions (12), (13), (14), (15):

$$6.0 < f_1/f_W < 12.0 \tag{12}$$

$$-5.0 < f_2/f_W < -2.0 \tag{13}$$

$$-4.5 < f_3/f_W < -1.5 \tag{14}$$

$$1.5 < f_4/f_W < 4.5 \tag{15}$$

where $f_1$ represents a focal length of the first lens group, $f_2$ represents a focal length of the second lens group, $f_3$ represents a focal length of the third lens group, represents a focal length of the fourth lens group, and $f_W$ represents an entire focal length at the wide-angle end.

When the refractive power of each lens group fulfills the conditions (12), (13), (14), (15), it is further suitable for a zoom lens unit having a magnification exceeding 25 times and a half angle of view at the telephoto end of about 0.5 degree.

Next, specific embodiments of the zoom lens unit, the imaging device and the monitoring video camera will be described. In this case, Embodiments 1 to 4 of the zoom lens unit will be described as the specific embodiments.

FIGS. 1 to 4 illustrate a zoom lens unit according to Embodiment 1 of the present invention. FIGS. 5 to 8 illustrate a zoom lens unit according to Embodiment 2 of the present invention. FIGS. 9 to 12 illustrate a zoom lens unit according to Embodiment 3 of the present invention. FIGS. 13 to 16 illustrate a zoom lens unit according to Embodiment 4 of the present invention.

The zoom lens unit of Embodiment 1, Embodiment 2, and Embodiment 4 includes a four-lens group configuration of positive, negative, negative, and positive. More specifically, the zoom lens unit of Embodiment 1, Embodiment 2, and Embodiment 4 includes, in order from the object side to the image side, a first lens group having positive refractive power and a focus function having a diffractive-optical element, a second lens group having negative refractive power, which moves when changing a magnification, a third lens group having negative refractive power, which moves when changing a magnification, and a fourth lens group having positive refractive power, which is fixed when changing a magnification.

In addition, the maximum image height in Embodiment 1, Embodiment 2, and Embodiment 3 is 4.0 mm, and the maximum image height in Embodiment 4 is 4.5 mm.

In each Embodiment, a parallel plate optical element is disposed on an optical path on the image surface side of the fourth lens group G4. The parallel plate optical element includes various filters such as an optical low-pass filter and an infrared light cut filter, and/or a cover glass (sealing glass) of a light-receiving imaging element such as a CMOS (Complementary Metal-Oxide Semiconductor) image sensor or a CCD (Charge-Coupled Device) image sensor. In this case, the optical element is illustrated as an equivalent transparent parallel plate, and is referred to as a filter FG The parallel plate optical element disposed between the third lens group G3 and the fourth lens group G4 includes an ND (from intermediate concentration to darkening) for adjusting a light volume. In this case, the optical element is illustrated as an equivalent transparent parallel plate, and is referred to as an adjustment filter ND.

A resin material is used for the diffraction portion in the first lens group in Embodiments 1, 2, 4, but an optical glass is used for the other diffraction portions. The glass material of the optical glass used in Embodiments 1, 2, 4 is illustrated by an optical glass manufactured by OHARA CO., LTD.

It should be noted that aberration of each zoom lens unit according to Embodiments 1 to 4 is sufficiently corrected, and the zoom lens units have the resolution compatible with the imaging element of 2,000,000 pixels or more. It is apparent from each of Embodiments 1 to 4 that the chromatic aberration is corrected from the visible light range to the near-infrared light rage, and a preferable imaging performance is obtained while achieving the magnification exceeding 25 times by configuring the zoom lens unit as the present invention.

Numerical codes and symbols used hereinafter represent as follows.
  f: focal length of entire system
  F: F value (F-number)
  ω: half-field angle
  r: curvature radius
  d: distance (interval) between lens surfaces
  nd: refractive index
  $v_d$: Abbe number
  $\theta_{C,A'}$: partial dispersion ratio=$(n_C-n_{A'})/(n_F-n_C)$
  $C_2$: coefficient of 2nd order in phase function
  $C_4$: coefficient of 4th order in phase function
The diffraction surface is expressed by the following equation (16):

$$\phi(h) = \frac{2\pi}{\lambda}(C_2 \cdot h^2 + C_4 \cdot h^4) \tag{16}$$

where $\lambda$ represents a reference wavelength and h represents a height from the optical axis. In addition, primary diffraction light is used for the imaging light, and the refractive power of the diffraction portion is $-2 \cdot C_2$.

Additionally, each of Embodiments illustrates a calculation result of a change in focus position at the wide-angle end with a temperature change from 20° C. to 70° C. Such a calculation result is based on the following assumption.

The refractive index of the lens changes with a temperature coefficient of a catalogue value of a material.

The shape of the lens homologous-deforms with a linear expansion coefficient of a catalogue value of a material.

A holding frame is made of aluminum alloy (linear expansion coefficient $236 \times 10^{-7}$/° C), and the lens is held by an effective diameter end.

Next, specific embodiments based on the present invention will be described.

Embodiment 1

At first, a zoom lens unit according to Embodiment 1 of the present invention will be described in detail.

Embodiment 1 is a specific embodiment (numerical embodiment) of the zoom lens unit.

FIGS. 1 to 4 are views illustrating the zoom lens unit according to Embodiment 1 (Numerical Embodiment 1) of the present invention.

FIG. 1 illustrates an overall arrangement of the zoom lens unit and a zoom trajectory of each lens group from a short focal length end to a long focal length end through a predetermined intermediate focal length, in accordance with Embodiment 1. To be specific, FIG. 1 illustrates an arrangement of the lenses at the short focal length end, namely, the wide-angle end, an arrangement of the lenses at a predetermined intermediate focal length, and an arrangement of the lenses at the long focal length end, namely, the telephoto end.

The zoom lens unit illustrated in FIG. 1 includes, in order from the object side to the image side, a first lens group G1 having positive refractive power and a focus function, a second lens group G2 having negative refractive power, which moves when changing a magnification, a third lens group G3 having negative refractive power, which moves when changing a magnification, and a fourth lens group G4 having positive refractive power, which is fixed when changing a magnification. An adjustment filter ND and an aperture stop AD are disposed between the third lens group G3 and the fourth lens group G4.

The first lens group G1 includes, in order from the object side to the image side, a first lens L1, a second lens L2, and a third lens L3. The second lens group G2 includes, in order from the object side to the image side, a fourth lens L4, a fifth lens L5, and a sixth lens L6. The third lens group G3 includes, in order from the object side to the image side, a seventh lens L7 and an eighth lens L8. The fourth lens group G4 includes, in order from the object side to the image side, a ninth lens L9, a tenth lens L10, an eleventh lens L11, a twelfth lens L12, a thirteenth lens L13, and a fourteenth lens L14. The third lens group G3 and the fourth lens group G4 include therebetween, in order from the object side to the image side, an adjustment filter ND and an aperture stop AD. The fourth lens group G4 and the image surface include therebetween a filter FG.

The first to the fourth lens groups G1 to G4 are appropriately supported by common supporting frames, respectively. The aperture stop AD and the fourth lens group G4 integrally operate. In FIG. 1, a surface number of each optical surface is illustrated. Note that reference numbers in FIG. 1 are independently used for each of Embodiments to avoid complex description due to an increase in digit number. Thus, even though the reference numbers common to the figures of the other embodiments are added, they are not always the same.

When changing a magnification from the wide-angle end (short focal length end) to the telephoto end (long focal length end), the first lens group G1 and the fourth lens group G4 are fixed while the second lens group G2 and the third lens group G3 move.

The detailed lens configuration of the zoom lens unit according to Embodiment 1 illustrated in FIG. 1 will be described.

The first lens group G1 includes, in order from the object side to the image side, the first lens L1 made of a negative meniscus lens having a concave surface on the image side, a diffractive-optical element including a resin layer made of a thin resin material, the second lens L2 made of a positive meniscus lens having a convex surface on the object side, and the third lens L3 made of a positive meniscus lens having a convex surface on the object side. The first lens L1 and the second lens L2 are integrally cemented through the resin layer to form a cemented lens. In this case, the diffraction surface is formed in a boundary surface of the resin layer. The cemented first lens L1, resin layer, and second lens L2 constitute a cemented lens as a diffractive-optical element.

The second lens group G2 includes, in order from the object side to the image side, the fourth lens L4 made of a biconcave lens in which an absolute value of a curvature radius on the image side surface is smaller than at on the object side surface, the fifth lens L5 made of a biconvex lens in which an absolute value of a curvature radius on the object side surface is smaller than that on the image side surface, the sixth lens L6 made of a biconcave lens in which an absolute value of a curvature radius on the image side surface is smaller than that on the object side surface. The fifth lens L5 and the sixth lens L6 are cemented to form a cemented lens of the two lenses.

The third lens group G3 includes, in order from the object side to the age side, the seventh lens L7 made of a biconcave lens in which an absolute value of a curvature radius on the image side surface is smaller than that on the object side surface, and the eighth lens L8 made of a positive meniscus lens having a convex surface on the object side. The seventh lens L7 and the eighth lens L8 are cemented to form a cemented lens made of two lenses.

The adjustment filter ND made of a filter for adjusting a light volume such as a parallel plate ND (intermediate concentration) darkening filter is arranged between the third lens group G3 and the fourth lens group G4, and the aperture stop AD is disposed between the adjustment filter ND and the fourth lens group G4.

The fourth lens group G4 includes, in order from the object side to the image side, the ninth lens L9 made of a biconvex lens in which an absolute value of a curvature radius on the image side surface is smaller than that on the object side surface, the tenth lens L10 made of a biconvex lens in which an absolute value of a curvature radius on the object side surface is smaller than that on the image side surface, the eleventh lens L11 made of a biconvex lens in which an absolute value of a curvature radius on the object side surface is smaller than that on the image side surface, the twelfth lens L12 made of a biconcave lens in which an absolute value of a curvature radius on the image side surface is smaller than that on the object side surface, the thirteenth lens L13 made of a biconcave lens in which an absolute value of a curvature radius on the image side surface is smaller than that on the object side surface, and the fourteenth lens L14 made of a biconvex lens in which an absolute value of a curvature radius on the object side surface is smaller than that on the image side surface.

The eleventh lens L11 and the twelfth lens L12 are cemented to form a cemented lens of the two lenses. The thirteenth lens L13 and the fourteenth lens L14 are cemented to form a cemented lens of the two lenses.

The filter FG such as various optical filters of parallel plates or a cover glass of a light-receiving imaging element is disposed on the optical path on the image surface side of the fourth lens group G4.

Additionally, the fourth lens group G4 includes a fourth front lens group G4F and a fourth latter lens group G4R. The fourth front lens group G4F includes the ninth lens L9. The fourth latter lens group G4R includes the tenth to fourteenth lenses L10 to L14.

In this case, as illustrated in FIG. 1, when changing a magnification from the wide-angle end (short focal length end) to the telephoto end (long focal length end), the first lens group G1 and the fourth lens group G4 are fixed. The second lens group G2 and the third lens group G3 move along a trajectory as illustrated in the figure from the wide-angle end to the telephoto end through the intermediate focal length.

In Embodiment 1, the focal length of the entire system f changes from 17.07 to 487.3, F-numberchanges from 4.01 to 6.96, and the half-field angle ω changes from 14.1 to 0.470. Optical characteristics of each optical element are shown in the following Table 1.

TABLE 1

$f = 17.1\text{-}487, F = 4.01\text{-}6.96, \omega = 14.1\text{-}0.470$

| SURFACE NUMBER | r | d | nd | $v_d$ | $\theta_{C,A}'$ | NAME OF GLASS TYPE | | |
|---|---|---|---|---|---|---|---|---|
| 01 | 144.855 | 2.50 | 1.83400 | 37.16 | 0.3245 | OHARA S-LAH60 | L1 | G1 |
| 02 | 76.469 | 0.10 | 1.64310 | 38.82 | 0.3124 | RESIN MATERIAL | | |
| 03* | 76.469 | 0.10 | 1.61505 | 26.54 | 0.2831 | RESIN MATERIAL | | |
| 04 | 76.469 | 10.59 | 1.48749 | 70.24 | 0.3633 | OHARA S-FSL5 | L2 | |
| 05 | 19773.507 | 0.20 | | | | | | |
| 06 | 74.791 | 10.29 | 1.43875 | 94.94 | 0.3529 | OHARA S-FPL53 | L3 | |
| 07 | 1414.256 | VARIABLE (DA) | | | | | | |
| 08 | −168.994 | 2.00 | 1.61800 | 63.33 | 0.3454 | OHARA S-PHM52 | L4 | G2 |
| 09 | 73.668 | 0.20 | | | | | | |
| 10 | 50.000 | 7.46 | 1.80000 | 29.84 | 0.3117 | OHARA S-NBH55 | L5 | |
| 11 | −161.070 | 2.00 | 1.74320 | 49.34 | 0.3414 | OHARA S-LAM60 | L6 | |
| 12 | 33.127 | VARIABLE (DB) | | | | | | |
| 13 | −55.514 | 1.50 | 1.60300 | 65.44 | 0.3498 | OHARA S-PHM53 | L7 | G3 |
| 14 | 19.259 | 2.83 | 1.85026 | 32.27 | 0.3145 | OHARA S-LAH71 | L8 | |
| 15 | 34.731 | VARIABLE (DC) | | | | | | |
| 16 | ∞ | 1.00 | 1.51633 | 64.14 | | FILTER (ND) | | |
| 17 | ∞ | 0.90 | | | | | | |
| 18 | APERTURE | 2.50 | | | | APERTURE (AD) | | |
| 19 | 68.120 | 3.62 | 1.49700 | 81.54 | 0.3501 | OHARA S-FPL51 | L9 | G4F |
| 20 | −64.999 | 0.20 | | | | | | |
| 21 | 36.048 | 3.73 | 1.49700 | 81.54 | 0.3501 | OHARA S-FPL51 | L10 | |
| 22 | −253.146 | 0.20 | | | | | | |
| 23 | 25.441 | 4.97 | 1.49700 | 81.54 | 0.3501 | OHARA S-FPL51 | L11 | G4R |
| 24 | −53.850 | 1.55 | 1.83400 | 37.16 | 0.3245 | OHARA S-LAH60 | L12 | |
| 25 | 23.762 | 2.83 | | | | | | |
| 26 | −34.001 | 1.50 | 1.48749 | 70.24 | 0.3633 | OHARA S-FSL5 | L13 | |
| 27 | 20.000 | 5.40 | 1.54072 | 47.23 | 0.3353 | OHARA S-TIL2 | L14 | |
| 28 | −30.706 | 57.344 | | | | | | |
| 29 | ∞ | 3.50 | 1.51633 | 64.14 | | FILTER | FG | |
| 30 | ∞ | 1.000 | | | | | | |

In Table 1, the optical surface shown by the surface number with * (asterisk) is a diffraction surface. Table 1 shows a material of each lens.

In other words, in Table 1, the third surface with * is a diffraction surface, and the parameters of the diffraction surface in the condition (18) are as follows.

In this case, $C_2$ represents a coefficient of 2nd order in a phase function of the diffraction surface, and $C_4$ represents a coefficient of fourth order in a phase function of the diffraction surface.

Diffraction Surface: Third Surface $\lambda = 587.59$ (nm)

$C_2 = -1.80594 \times 10^{-5}$ $C_4 = 1.02994 \times 10^{-9}$

In Embodiment 1, when zooming is carried out from the wide-angle end (short focal length end) to the telephoto end (long focal length end) through the intermediate focal length, the focal length f of the entire optical system, a variable interval DA between the first lens group G1 and the second lens group G2, a variable interval DB between the second lens group G2 and the third lens group G3, and a variable interval DC between the third lens group G3 and the adjustment filter ND change as shown in the following Table 2.

TABLE 2

VARIABLE INTERVAL

| | WIDE-ANGLE END | INTERMEDIATE FOCAL LENGTH | TELE-PHOTO END |
|---|---|---|---|
| FOCAL LENGTH | f = 17.07 | f = 91.34 | f = 487.3 |
| DA | 5.400 | 77.984 | 91.096 |
| DB | 66.759 | 6.083 | 54.757 |
| DC | 76.794 | 64.886 | 3.100 |

In Embodiment 1, when zooming is carried out from the wide-angle end (short focal length end) to the telephoto end (long focal length end) through the intermediate focal length, the focal length f of the entire optical system, a magnification of the second lens group G2, a magnification of the third lens group G3, and a magnification of the fourth lens group G4 change as shown in the following Table 3.

TABLE 3

MAGNIFICATION OF EACH LENS GROUP

| | WIDE-ANGLE END | INTERMEDIATE FOCAL LENGTH | TELE-PHOTO END |
|---|---|---|---|
| FOCAL LENGTH | f = 17.07 | f = 91.34 | f = 487.3 |
| SECOND LENS GROUP | −0.821 | 14.545 | 3.320 |
| THIRD LENS GROUP | 0.206 | −0.0623 | −1.455 |
| FOURTH LENS GROUP | −0.680 | −0.680 | −0.680 |

In this case, the values corresponding to the condition (1), condition (2), and conditions (5) to (15) are as follows, and fulfill the condition (1), condition (2), and conditions (5) to (15).

Value of Condition $|M_{2W} \cdot M_{3W} \cdot M_{4W}| = 0.115$ (1):

$|1 - M_{4W}^2| = 0.536$ (2):

$\alpha = 131 \times 10^{-7}/°$ C. (OHARA S-FPL51) (5):

$dn/dt = -6.2 \times 10^{-6}/°$ C. (OHARA S-FPL51) (6):

$v_d = 81.51 (L9-L11)$ (7):

$\theta_{C,A} - 0.000667 \cdot v_d = 0.2957 (L9-L11)$ (8):

$L_4/T_{4F-I} = 0.284$ (9):

$f_T/f_{DOE} = 0.0176$ (10):

$v_{1GP} = 82.6$ (11):

$f_1/f_W = 8.68$ (12):

$f_2/f_W = -3.30$ (13):

$f_3/f_W = -2.60$ (14):

$f_4/f_W = 2.75$ (15):

A change in focus position at the wide-angle end with a temperature change of the zoom lens unit from 20° C. to 70° C. is +0.288 mm, and a displacement of the fourth lens group required for correcting the change in focus position is 0.537 mm toward the object side.

FIGS. 2, 3, 4 respectively show spherical aberration graphs, astigmatism aberration graphs, distortion aberration graphs, and coma aberration graphs at the wide-angle end (short focal length end), at the intermediate focal length, and at the telephoto end (long focal length end) of the zoom lens unit according to Embodiment 1, In the drawings, dashed lines in the spherical aberration graphs represent a sine condition, solid lines in the astigmatism aberration graphs represent sagittal aberration, and dashed lines in the astigmatism aberration graphs represent meridional aberration. Note that aberration graphs for other Embodiments are drawn in the same manner.

Embodiment 2

A zoom lens unit according to Embodiment 2 of the present invention will be described in detail.

Embodiment 2 is a specific embodiment (numerical embodiment) of the zoom lens unit.

FIGS. 5 to 8 illustrate the zoom lens unit according to Embodiment 2 (Numerical Embodiment 2) of the present invention.

FIG. 5 illustrates an overall arrangement of the zoom lens unit and a zoom trajectory of each lens group from a short focal length end to a long focal length end through a predetermined intermediate focal length, in accordance with Embodiment 2. To be specific, FIG. 5 illustrates an arrangement of the lenses at the short focal length end, namely, the wide-angle end, an arrangement of the lenses at a predetermined intermediate focal length, and an arrangement of the lenses at the long focal length end, namely, the telephoto end.

The zoom lens unit shown in FIG. 5 includes, in order from the object side to the image side, a first lens group G1 having positive refractive power and s focus function, a second lens group G2 having negative refractive power, which moves when changing a magnification, a third lens group G3 having negative refractive power, which moves when changing a magnification, and a fourth lens group G4 having positive refractive power, which is fixed when changing a magnification. An adjustment filter ND and an aperture stop AD are arranged between the third lens group G3 and the fourth lens group G4.

The first lens group G1 includes, in order from the object side to the image side, a first lens L1, a second lens L2, and a third lens L3. The second lens group G2 includes, in order from the object side to the image side, a fourth lens L4, a fifth lens L5, and a sixth lens L6. The third lens group G3 includes, in order from the object side to the image side, a seventh lens L7 and an eighth lens L8. The fourth lens group G4 includes, in order from the object side to the image side, a ninth lens L9, a tenth lens L10, an eleventh lens L11, a twelfth lens L12, a thirteenth lens L13, and a fourteenth lens L14. The third lens group G3 and the fourth lens group G4 include therebetween, in order from the object side to the image side, the adjustment filter ND and the aperture stop AD. The fourth lens group G4 and the image surface include therebetween a filter FG.

The first to the fourth lens groups G1 to G4 are appropriately supported by common supporting frames, respectively. The aperture stop AD and the fourth lens group integrally operate. In FIG. 5, a surface number of each optical surface is illustrated.

When changing a magnification from the wide-angle end (short focal length end) to the telephoto end (long focal length end), the first lens group G1 and the fourth lens group G4 are fixed while the second lens group G2 and the third lens group G3 move.

The detailed lens configuration of the zoom lens unit according to Embodiment 2 illustrated in FIG. 5 will be described. The first lens group G1 includes, in order from the object side to the image side, the first lens L1 made of a negative meniscus lens having a concave surface on the image side, a diffractive-optical element including a resin layer made of a thin resin material, the second lens L2 made of a positive meniscus lens having a convex surface on the object side, and the third lens L3 made of a positive meniscus lens having a convex surface on the object side. The first lens L1 and the second lens L2 are cemented through the resin layer to form a cemented lens. In this case, a diffraction surface is formed in a boundary surface of the resin layer. The cemented first lens L1, resin layer, and second layer L2 constitute a cemented lens as a diffractive-optical element.

The second lens group G2 includes, in order from the object side to the age side, the fourth lens L4 made of a biconcave lens in which an absolute value of a curvature radius on the image side surface is smaller than that on the object side surface, the fifth lens L5 made of a biconvex lens in which an absolute value of a curvature radius on the object side surface is smaller than that on the image surface side surface, and the sixth lens L6 made of a biconcave lens in which an absolute value of a curvature radius on the image side surface is smaller than that on the object side surface. The fifth lens L5 and the sixth lens L6 are cemented to form a cemented lens of the two lenses.

The third lens group G3 includes, in order from the object side to the image side, the seventh lens L7 made of a biconcave lens in which an absolute value of a curvature radius on the image side surface is smaller than that on the object side surface, and the eighth lens L8 made of a positive meniscus lens having a convex surface on the object side. The seventh lens L7 and the eighth lens L8 are cemented to form a cemented lens of the two lenses.

The adjustment filter ND made of a filter for adjusting a light volume such as a parallel plate ND (intermediate concentration) darkening filter is arranged between the third lens group G3 and the fourth lens group G4. The aperture stop AD is arranged between the adjustment filter ND and the fourth lens group G4.

The fourth lens group G4 includes, in order from the object side to the image side, the ninth lens L9 made of a biconvex lens in which an absolute value of a curvature radius on the image side surface is smaller than that on the object side surface, the tenth lens L10 made of a biconvex lens in which an absolute value of a curvature radius on the object side surface is smaller than that on the image side surface, the eleventh lens L11 made of a biconvex lens in which an absolute value of a curvature radius on the object side surface is smaller than that on the image side surface, the twelfth lens L12 made of a biconcave lens in which an absolute value of a curvature radius on the image side surface is smaller than that on the object side surface, the thirteenth lens L13 made of a biconcave lens in which an absolute value of a curvature radius on the image side surface is smaller than that on the object side surface, and the fourteenth lens L14 made of a biconvex lens in which an absolute value of a curvature radius on the object side surface is smaller than that on the image side surface.

The eleventh lens L4 and the twelfth lens L12 are cemented to form a cemented lens of the two lenses. The thirteenth lens L13 and the fourteenth lens L14 are cemented to form a cemented lens of the two lenses.

The filter FG such as various optical filters of parallel plates or a cover glass of a light-receiving imaging element is disposed on the optical path on the image surface side of the fourth lens group G4.

Additionally, the fourth lens group G4 includes a fourth front lens group G4F and a fourth latter lens group G4R. The fourth front lens group G4F includes the ninth lens L9. The fourth latter lens group (G4R includes the tenth lens L10 to the fourteenth lens L14.

In this case, as illustrated in FIG. 5, when changing a magnification from the wide-angle end (short focal length end) to the telephoto end (long focal length end), the first lens group G1 and the fourth lens group G4 are fixed. The second lens group G2 and the third lens group G3 move along a trajectory as illustrated in the figure from the wide-angle end to the telephoto end through the intermediate focal length.

In Embodiment 2, when zooming is carried out, the focal length f of the entire optical system changes from 17.1 to 486, the F-number changes from 4.00 to 6.95, and the half-field angle w changes from 14.2 to 0.471. Optical characteristics of each optical element are shown in the following Table 4.

TABLE 4 f = 17.1-486, F = 4.00-6.95, ω = 14.2-0.471

| SURFACE NUMBER | r | d | nd | $v_d$ | $\theta_{C,A}'$ | NAME OF GLASS TYPE | | |
|---|---|---|---|---|---|---|---|---|
| 01 | 138.534 | 2.50 | 1.83400 | 37.16 | 0.3245 | OHARA S-LAH60 | L1 | G1 |
| 02 | 75.010 | 0.10 | 1.64310 | 38.82 | 0.3124 | RESIN MATERIAL | | |
| 03* | 75.010 | 0.10 | 1.61505 | 26.54 | 0.2831 | RESIN MATERIAL | | |
| 04 | 75.010 | 10.72 | 1.48749 | 70.24 | 0.3633 | OHARA S-FSL5 | L2 | |
| 05 | 9346.827 | 0.20 | | | | | | |
| 06 | 73.420 | 10.32 | 1.43875 | 94.94 | 0.3529 | OHARA S-FPL53 | L3 | |
| 07 | 1141.217 | VARIABLE (DA) | | | | | | |
| 08 | −211.333 | 2.00 | 1.59522 | 67.73 | 0.3431 | OHARA S-FPM2 | L4 | G2 |
| 09 | 85.820 | 0.20 | | | | | | |
| 10 | 50.000 | 8.57 | 1.68893 | 31.07 | 0.3142 | OHARA S-TIM28 | L5 | |
| 11 | −72.415 | 2.00 | 1.74320 | 49.34 | 0.3414 | OHARA S-LAM60 | L6 | |
| 12 | 32.269 | VARIABLE (DB) | | | | | | |
| 13 | −46.892 | 1.50 | 1.59522 | 67.73 | 0.3431 | OHARA S-FPM2 | L7 | G3 |
| 14 | 16.804 | 2.86 | 1.85026 | 32.27 | 0.3145 | OHARA S-LAH71 | L8 | |
| 15 | 29.833 | VARIABLE (DC) | | | | | | |
| 16 | ∞ | 1.00 | 1.51633 | 64.14 | | FILTER (ND) | | |
| 17 | ∞ | 0.90 | | | | | | |
| 18 | APERTURE | 2.50 | | | | APERTURE (AD) | | |
| 19 | 71.102 | 3.88 | 1.43875 | 94.94 | 0.3529 | OHARA S-FPL53 | L9 | G4F |
| 20 | −49.574 | 0.20 | | | | | | |
| 21 | 33.482 | 3.99 | 1.49700 | 81.54 | 0.3501 | OHARA S-FPL51 | L10 | |
| 22 | −174.686 | 0.21 | | | | | | |
| 23 | 23.063 | 4.97 | 1.49700 | 81.54 | 0.3501 | OHARA S-FPL51 | L11 | G4R |
| 24 | −59.924 | 3.33 | 1.83400 | 37.16 | 0.3245 | OHARA S-LAH60 | L12 | |
| 25 | 20.958 | 2.86 | | | | | | |
| 26 | −31.574 | 1.50 | 1.48749 | 70.24 | 0.3633 | OHARA S-FSL5 | L13 | |
| 27 | 20.000 | 5.03 | 1.54814 | 45.78 | 0.3331 | OHARA S-TIL1 | L14 | |
| 28 | −31.180 | 51.371 | | | | | | |
| 29 | ∞ | 3.50 | 1.51633 | 64.14 | | FILTER | FG | |
| 30 | ∞ | 1.000 | | | | | | |

In Table 4, the optical surface shown by the surface number with * (asterisk) is a diffraction surface. Table 4 shows a material of each lens.

In other words, in Table 4, the third surface with * is a diffraction surface, and the parameters of the diffraction surface in the condition (16) are as follows.

In this case, $C_2$ represents a coefficient of 2nd order in a phase function of the diffraction surface, and $C_4$ represents a coefficient of 4th order in a phase function of the diffraction surface.

Diffraction Surface: Third Surface

λ=587.56 (nm)

$C_2 = -2.05523 \times 10^{-5}$ $C_4 = 8.88676 \times 10^{-10}$

In Embodiment 2, when zooming is carried out from the wide-angle end (short focal length end) to the telephoto end (long focal length end) through the intermediate focal length, the focal length f of the entire optical system, a variable interval DA between the first lens group G1 and the second lens group G2, a variable interval DB between the second lens group G2 and the third lens group G3, and a variable interval DC between the third lens group G3 and the adjustment filter ND change as shown in the following Table 5.

TABLE 5

VARIABLE INTERVAL

|  | WIDE-ANGLE END | INTERMEDIATE FOCAL LENGTH | TELE-PHOTO END |
|---|---|---|---|
| FOCAL LENGTH | f = 17.08 | f = 91.53 | f = 486.2 |
| DA | 7.192 | 75.842 | 89.762 |
| DB | 65.781 | 6.155 | 43.715 |
| DC | 63.691 | 54.667 | 3.187 |

In Embodiment 2, when zooming is carried out from the wide-angle end (short focal length end) to the telephoto end (long focal length end) through the intermediate focal length, the focal length f of the entire optical system, a magnification of the second lens group G2, a magnification of the third lens group G3, a magnification of the fourth lens group G4 change as shown in the following Table 6.

TABLE 6

MAGNIFICATION OF EACH LENS GROUP

|  | WIDE-ANGLE END | INTERMEDIATE FOCAL LENGTH | TELE-PHOTO END |
|---|---|---|---|
| FOCAL LENGTH | f = 17.08 | f = 91.53 | f = 486.2 |
| SECOND LENS GROUP | −0.787 | 19.702 | 3.137 |
| THIRD LENS GROUP | 0.194 | −0.0415 | −1.383 |
| FOURTH LENS GROUP | −0.777 | −0.777 | −0.777 |

In this case, the values corresponding to the condition (1), condition (2), and. conditions (5) to (15) are as follows, and fulfill the condition (1), condition (2), and conditions (5) to (15).

Value of Condition $|M_{2W} \cdot M_{3W} \cdot M_{4W}| = 0.118$ (1):

$|1 - M_{4W}^2| = 0.397$ (2):

$\alpha = 145 \times 10^{-7}/°$ C. (OHARA S-FPL53) (5):

$dn/dt = -6.7 \times 10^{-8}/°$ C. (OHARA S-FPL53) (6):

$\alpha = 131 \times 10^{-7}/°$ C. (OHARA S-FPL51) (5):

$dn/dt = -6.2 \times 10^{-6}/°$ C. (OHARA S-FPL51) (6):

$v_d = 94.94 (L9), 81.51 (L10 \cdot L11)$ (7):

$\theta_{C,A} - 0.000667 \cdot v_d = 0.2896 (L9), 0.2957 (L10 \cdot L11)$ (8):

$L_4/T_{4F-I} = 0.322$ (9):

$f_T/f_{DOE} = 0.200$ (10):

$v_{1GP} = 82.6$ (11):

$f_1/f_W = 8.45$ (12):

$f_2/f_W = -3.04$ (13):

$f_3/f_W = -2.25$ (14):

$f_4/f_W = 2.48$ (15):

A change in focus position at the wide-angle end with a temperature change of the zoom lens unit from 20° C. to 70° C. is +0.304 mm, and a displacement of the fourth lens group required for correcting the change in focus position is 0.766 mm toward the object side.

Figure 6:
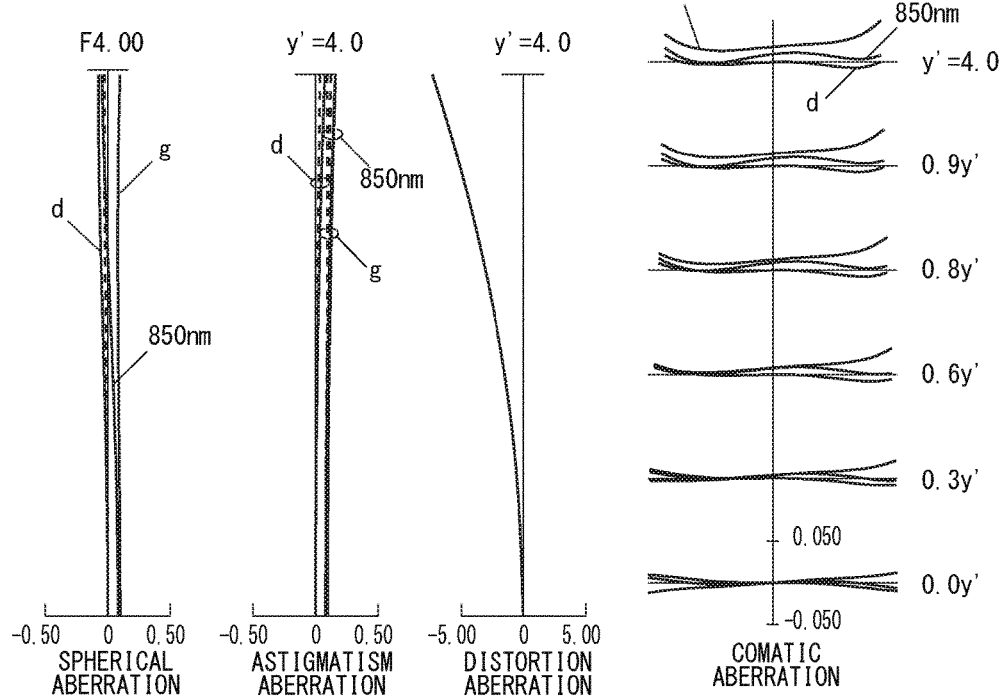
FIG. 6 shows graphs illustrating curves of spherical aberration, astigmatism aberration, distortion aberration, and coma aberration at the wide-angle end of the zoom lens unit according to Embodiment 2 illustrated in FIG. 5.
Figure 7:
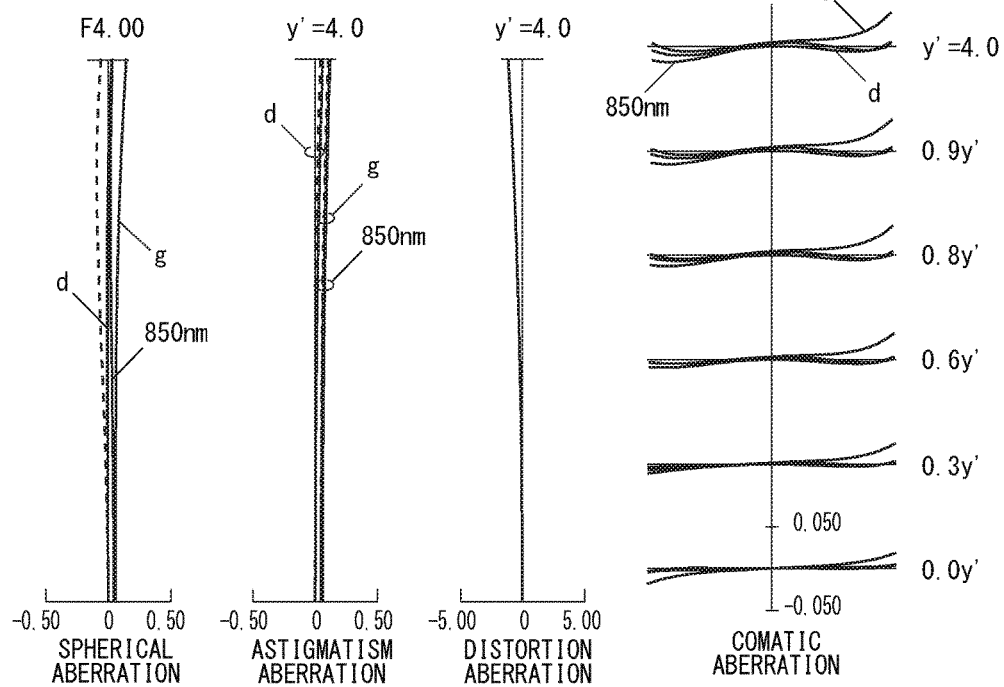
FIG. 7 shows graphs illustrating curves of spherical aberration, astigmatism aberration, distortion aberration, and coma aberration at the intermediate focal length according to Embodiment 2 illustrated in FIG. 5.
Figure 8:
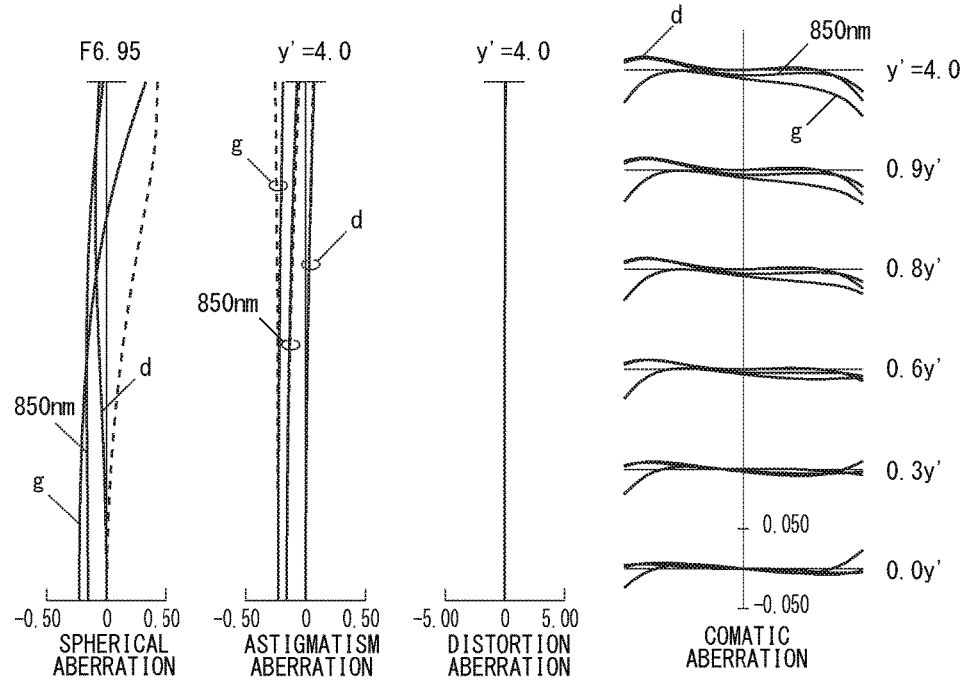
FIG. 8 shows graphs illustrating curves of spherical aberration, astigmatism aberration, distortion aberration, and coma aberration at the telephoto end of the zoom lens unit according to Embodiment 2 illustrated in FIG. 5.

FIGS. 6, 7, 8 respectively show spherical aberration graphs, astigmatism aberration graphs, distortion aberration graphs, and coma aberration graphs at the wide-angle end, at the intermediate focal length, and at the telephoto end of the zoom lens unit according to Embodiment 2. In the drawings, dashed lines in the spherical aberration graphs represent a sine condition, solid lines in the astigmatism aberration graphs represent sagittal aberration, and dashed lines in the astigmatism aberration graphs represent meridional aberrations. Note that aberration graphs for other Embodiments are drawn in the same manner.

Embodiment 3

Next, a zoom lens unit according to Embodiment 3 of the present invention will be described in detail.

Embodiment 3 is a specific embodiment (numerical embodiment) of the zoom lens unit.

FIGS. 9 to 12 illustrate the zoom lens unit according to Embodiment 3 (Numerical Embodiment 3) of the present invention.

FIG. 9 illustrates an overall arrangement of the zoom lens unit and a zoom trajectory of each lens group from a short focal length end to a long focal length end through a predetermined intermediate focal length, in accordance with Embodiment 3. To be specific, FIG. 9 illustrates an arrangement of the lenses at the short focal length end, namely, the wide-angle end, an arrangement of the lenses at a predetermined intermediate focal length, and an arrangement of the lenses at the long focal length end, namely, the telephoto end.

The zoom lens unit shown in FIG. 9 includes, in order from the object side to the image side, a first lens group G1 having positive refractive power and a focus function, a second lens group G2 having negative refractive power, which moves when changing a magnification, a third lens group G3 having negative refractive power, which moves when changing a magnification, and a fourth lens group G4 having positive refractive power, which is fixed when changing a magnification. An adjustment filter ND and an aperture stop AD are arranged between the third lens group G3 and the fourth lens group G4.

The first lens group G1 includes, in order from the object side to the image side, a first lens L1, a second lens L2, a third lens L3, a fourth lens L4, and a fifth lens L5. The second lens group G2 includes, in order from the object side to the image side, a sixth lens L6, a seventh lens L7, and an eighth lens L8. The third lens group G3 includes, in order from the object side to the image side, a ninth lens L9 and a tenth lens L10. The fourth lens group G4 includes, in order from the object side to the image side, an eleventh lens L11, a twelfth lens L12, a thirteenth lens L13, a fourteenth lens L14, a fifteenth lens L15, and a sixteenth lens L16. The third lens group G3 and the fourth lens group G4 include therebetween, in order from :he object side to the image side, an adjustment filter ND and an aperture stop AD. The fourth lens group G4 and the image surface include therebetween a filter FG.

The first to fourth lens groups G1 to G4 are appropriately supported by common supporting frames, respectively. The aperture stop AD and the fourth lens group G4 integrally operate. In FIG. 9, a surface number of each optical surface is illustrated.

Note that reference numbers in FIG. 9 are independently used for each of Embodiments to avoid complex description due to an increase in digit nutriber. Thus, even though the reference numbers common to the figures of the other embodiments are added, they are not always the same.

When changing a magnification from the wide-angle end (short focal length end) to the telephoto end (long focal length end), the first lens group G1 and the fourth lens group G4 are fixed while the second lens group G2 and the third lens group G3 move.

The detailed configuration of the zoom lens unit according to Embodiment 3 illustrated in FIG. 9 will be described.

The first lens group G1 includes, in order from the object side to the image side, the first lens L1 made of a negative meniscus lens having a concave surface on the image side, the second lens L2 made of a positive meniscus lens having a convex surface on the object side, the third lens L3 made of a negative meniscus lens having a convex surface on the object side, the fourth lens L4 made of a positive meniscus lens having a convex surface on the object side, and the fifth lens L5 made of a positive meniscus lens having a convex surface on the object side.

The second lens group G2 includes, in order from the object side to the image side, the sixth lens L6 made of a biconcave lens in which an absolute value of a curvature radius on the object side surface is smaller than that on the image side surface, the seventh lens L7 made of a biconvex lens in which an absolute value of a curvature radius on the image side surface is smaller than that on the object side surface, and the eighth lens made of a biconcave lens in which an absolute value of a curvature radius on the object side surface is smaller than that on the image side surface. The seventh lens L7 and the eighth lens L8 are cemented to form a cemented lens of two lenses.

The third lens group G3 includes, in order from the object side to the image side, the ninth lens L9 made of a biconcave lens in which an absolute value of a curvature radius on the image side surface is smaller than that on the object side surface, and the tenth lens L10 made of a positive meniscus lens having a convex surface on the object side. The ninth lens L9 and the tenth lens L10 are cemented to form a cemented lens of two lenses.

The adjustment filter ND made of a filter for adjusting a light volume such as a parallel plate ND (intermediate concentration) darkening filter is arranged between the third lens group G3 and the fourth lens group G4. The aperture stop AD is arranged between the adjustment filter ND and the fourth lens group G4.

The fourth lens group G4 includes, in order from the object side to the image side, the eleventh lens L11 made of a biconvex lens in which an absolute value of a curvature radius on the object side surface is smaller than that on the image side surface, the twelfth lens L12 made of a biconvex lens in which an absolute value of a curvature radius on the object side surface is smaller than that on the image side surface, the thirteenth lens L13 made of a biconvex lens in which an absolute value of a curvature radius on the object side surface is smaller than that on the image side surface, the fourteenth lens L14 made of a biconcave lens in which an absolute value of a curvature radius on the object side surface is smaller than that on the image side surface, the fifteenth lens L15 made of a negative meniscus lens having a concave surface on the image side, and the sixteenth lens L16 made of a biconvex lens in which an absolute value of a curvature radius on the object side surface is smaller than that on the image side surface.

The thirteenth lens L13 and the fourteenth lens L14 are cemented to form a cemented lens of the two lenses. The fifteenth lens L15 and the sixteenth lens L16 are cemented to form a cemented lens of the two lenses.

The filter FG such as various optical filters of parallel plates or a cover glass of a light-receiving element is arranged on the optical path on the image surface side of the fourth lens group G4.

Additionally, the fourth lens group G4 includes a fourth front lens group G4F and a fourth latter lens group G4R. The fourth front lens group G4F includes the eleventh lens L11, and the fourth latter lens group G4R includes the twelfth lens L12 to the sixteenth lens L16.

In this case, as illustrated in FIG. 9, when changing a magnification from the wide-angle end (short focal length end) to the telephoto end (long focal length end), the first lens group G1 and the fourth lens group G4 are fixed. The second lens group G2 and the third lens group G3 move along a trajectory as illustrated in the figure from the wide-angle end to the telephoto end through the intermediate focal length.

In Embodiment 3, when zooming is carried out, the focal length f of the entire optical system changes from 17.1 to 487, the F-number changes from 4.00 to 6.96, and the half-field angle w changes from 14.1 to 0.470, Optical characteristics of each optical element are shown in the following Table 7.

TABLE 7

| | | | | | | | | |
|---|---|---|---|---|---|---|---|---|
| $f = 17.1$-487, $F = 4.00$-6.96, $\omega = 14.1$-0.470 | | | | | | | | |
| SURFACE NUMBER | r | d | nd | $v_d$ | $\theta_{C,A}'$ | NAME OF GLASS TYPE | | |
| 01 | 172.744 | 2.50 | 1.78800 | 47.37 | 0.3383 | OHARA S-LAH64 | L1 | G1 |
| 02 | 81.144 | 0.78 | | | | | | |
| 03 | 80.286 | 9.17 | 1.43875 | 94.94 | 0.3529 | OHARA S-FPL53 | L2 | |
| 04 | 505.373 | 0.20 | | | | | | |
| 05 | 98.978 | 2.50 | 1.51742 | 52.43 | 0.3410 | OHARA S-NSL36 | L3 | |
| 06 | 68.083 | 0.96 | | | | | | |
| 07 | 69.238 | 10.05 | 1.43875 | 94.94 | 0.3529 | OHARA S-FPL53 | L4 | |
| 08 | 368.951 | 0.20 | | | | | | |
| 09 | 82.756 | 9.61 | 1.43875 | 94.94 | 0.3529 | OHARA S-FPL53 | L5 | |

TABLE 7-continued f = 17.1-487, F = 4.00-6.96, ω = 14.1-0.470

| SURFACE NUMBER | r | d | nd | $v_d$ | $\theta_{C,A}'$ | NAME OF GLASS TYPE | | |
|---|---|---|---|---|---|---|---|---|
| 10 | 5833.436 | VARIABLE (DA) | | | | | | |
| 11 | −104.036 | 2.00 | 1.59522 | 67.73 | 0.3431 | OHARA S-FPM2 | L6 | G2 |
| 12 | 211.482 | 0.20 | | | | | | |
| 13 | 86.251 | 7.34 | 1.80000 | 29.84 | 0.3117 | OHARA S-NBH55 | L7 | |
| 14 | −50.501 | 2.00 | 1.74320 | 49.34 | 0.3414 | OHARA S-LAM60 | L8 | |
| 15 | 33.103 | VARIABLE (DB) | | | | | | |
| 16 | −46.420 | 1.50 | 1.60300 | 65.44 | 0.3498 | OHARA S-PHM53 | L9 | G3 |
| 17 | 16.928 | 2.36 | 1.85026 | 32.27 | 0.3145 | OHARA S-LAH71 | L10 | |
| 18 | 30.729 | VARIABLE (DC) | | | | | | |
| 19 | ∞ | 1.00 | 1.51633 | 64.14 | | FILTER (ND) | | |
| 20 | ∞ | 0.90 | | | | | | |
| 21 | APERTURE | 3.50 | | | | APERTURE (AD) | | |
| 22 | 75.345 | 3.41 | 1.49700 | 81.54 | 0.3501 | OHARA S-FPL51 | L11 | G4F |
| 23 | −86.106 | 1.70 | | | | | | |
| 24 | 70.964 | 3.31 | 1.49700 | 81.54 | 0.3501 | OHARA S-FPL51 | L12 | G4R |
| 25 | −117.159 | 0.20 | | | | | | |
| 26 | 41.750 | 4.51 | 1.49700 | 81.54 | 0.3501 | OHARA S-FPL51 | L13 | |
| 27 | −45.320 | 1.50 | 1.83400 | 37.16 | 0.3245 | OHARA S-LAH60 | L14 | |
| 28 | 50.233 | 1.71 | | | | | | |
| 29 | 629.774 | 1.50 | 1.48749 | 70.24 | 0.3633 | OHARA S-FSL5 | L15 | |
| 30 | 20.000 | 5.48 | 1.51742 | 52.43 | 0.3410 | OHARA S-NSL36 | L16 | |
| 31 | −63.386 | 64.546 | | | | | | |
| 32 | ∞ | 3.50 | 1.51633 | 64.14 | | FILTER | FG | |
| 33 | ∞ | 1.000 | | | | | | |

In Embodiment 3, when zooming is carried out from the wide-angle end (short focal length end) to the telephoto end (long focal length end) through the intermediate focal length, the focal length f of the entire optical system, a variable interval DA between the first lens group G1 and the second lens group G2, a variable interval DB between the second lens group G2 and the third lens group G3, and a variable interval DC between the third lens group G3 and the adjustment filter ND change as shown in the following Table 8.

TABLE 8

VARIABLE INTERVAL

| | WIDE-ANGLE END | INTERMEDIATE FOCAL LENGTH | TELE-PHOTO END |
|---|---|---|---|
| FOCAL LENGTH | f = 17.08 | f = 91.51 | f = 487.2 |
| DA | 6.436 | 70.816 | 83.849 |
| DB | 61.795 | 6.263 | 43.915 |
| DC | 62.699 | 53.851 | 3.166 |

In Embodiment 3, when zooming is carried out from the wide-angle end (short focal length end) to the telephoto end (long focal length end) through the intermediate focal length, the focal length f of the entire optical system, a magnification of the second lens group G2, a magnification of the third lens group G3, a magnification of the fourth lens group G4 change as shown in the following Table 9.

TABLE 9

MAGNIFICATION OF EACH LENS GROUP

| | WIDE-ANGLE END | INTERMEDIATE FOCAL LENGTH | TELE-PHOTO END |
|---|---|---|---|
| FOCAL LENGTH | f = 17.08 | f = 91.51 | f = 487.2 |
| SECOND LENS GROUP | −0.774 | 30.028 | 3.314 |
| THIRD LENS GROUP | 0.203 | −0.0281 | −1.353 |
| FOURTH LENS GROUP | −0.801 | −0.801 | −0.801 |

In this case, the values corresponding to the conditions (1) to (9) and conditions (11) to (15) are as follows, and fulfill the conditions (1) to (9) and conditions (11) to (15).

Value of Condition $|M_{2W} \cdot M_{3W} \cdot M_{4W}| = 0.126$ (1):

$|1 - M_{4W}^2| = 0.358$ (2):

$|(1 - M_{4FW}^2) \cdot M_{4FW}^2| = 0.609$ (FOURTH FRONT LENS GROUP; SURFACE NUMBER 22-23) (3):

$|1 - M_{4FW}^2| = 0.968$ (FOURTH LATTER LENS GROUP SURFACE NUMBER 24-31) (4):

$\alpha = 131 \times 10^{-7}/°$ C. (OHARA S-FPL51) (5):

$dn/dt = -6.2 \times 10^{-6}/°$ C. (OHARA S-FPL51) (6):

$v_d = 81.51$ (L11-L13) (7):

$\theta_{C,A} = -0.000667 \quad v_d = 0.2957$ (L11-L13) (8):

$L_4/T_{4F-I} = 0.256$ (9):

$f_T/f_{DOE} = NA$ (10):

$v_{1GP} = 94.9$ (11):

$f_1/f_W = 7.94$ (12):

$f_2/f_W = -2.84$ (13):

$f_3/f_W=-2.24$ (14):

$f_4/f_W=2.66$ (15):

A change in focus position at the wide-angle end with a temperature change of the zoom lens unit from 20° C. to 70° C. is +0.210 mm, a displacement of the fourth lens group required for correcting the change in focus position is 0.587 mm toward the object side, a displacement of the fourth front lens group is 0.345 mm toward the image side, and a displacement of the fourth latter lens group is 0.217 mm toward the object side.

Figure 12:
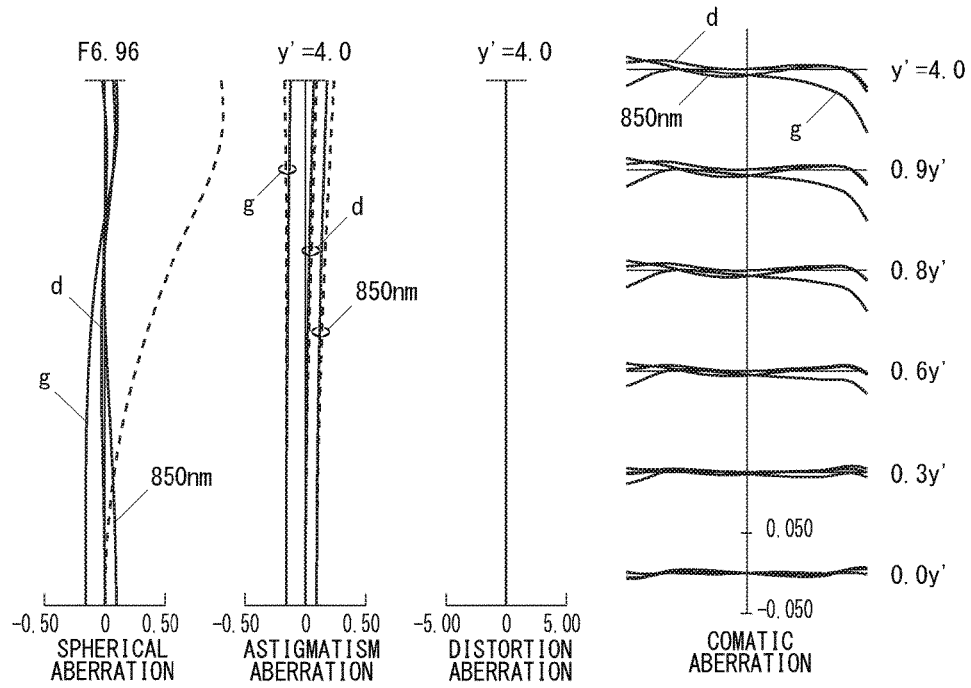
FIG. 12 shows graphs illustrating curves of spherical aberration, astigmatism aberration, distortion aberration, and coma aberration at the telephoto end of the zoom lens unit according to Embodiment 3 illustrated in FIG. 9.

FIGS. 10, 11, 12 respectively show spherical aberration graphs, astigmatism aberration graphs, distortion aberration graphs, and coma aberration graphs at the wide-angle end, at the intermediate focal length, and at the telephoto end of the zoom lens unit according to Embodiment 3. In the drawings, dashed lines in the spherical aberration graphs represent a sine condition, solid lines in the astigmatism aberration graphs represent sagittal aberration, and dashed lines in the astigmatism aberration graphs represent meridional aberrations. Note that aberration graphs for other Embodiments are drawn in the same manner.

Embodiment 4

Next, a zoom lens unit according to Embodiment 4 of the present invention will be described in detail.

Embodiment 4 is a specific embodiment (numerical embodiment) of the zoom lens unit.

FIGS. 13 to 16 illustrate the zoom lens unit according to Embodiment 4 (Numerical Embodiment 4) of the present invention.

FIG. 13 illustrates an overall arrangement of the zoom lens unit and a zoom trajectory of each lens group from a short focal length end to a long focal length end through a predetermined intermediate focal length, in accordance with Embodiment 4. To be specific, FIG. 13 illustrates an arrangement of the lenses at the short focal length end, namely, the wide-angle end, an arrangement of the lenses at a predetermined intermediate focal length, and an arrangement of the lenses at the long focal length end, namely, the telephoto end.

The zoom lens unit shown in FIG. 13 includes, in order from the object side to the image side, a first lens group G1 having positive refractive power and a focus function, a second lens group G2 having negative refractive power, which moves when changing a magnification, a third lens group G3 having negative refractive power, which moves when changing a magnification, and a fourth lens group G4 having positive refractive power, which is fixed when changing a magnification. An adjustment filter ND and an aperture stop AD are arranged between the third lens group G3 and the fourth lens group G4.

The first lens group G1 includes, in order from the object side to the image side, a first lens L1, a second lens L2, and a third lens L3. The second lens group G2 includes, in order from the object side to the image side, a fourth lens L4, a fifth lens L5, and a sixth lens L6. The third lens group G3 includes, in order from the object side to the image side, a seventh lens L7 and an eighth lens L8. The fourth lens group G4 includes, in order from the object side to the image side, a ninth lens L9, a tenth lens L10, an eleventh lens L11, a twelfth lens L12, a thirteenth lens L13, and a fourteenth lens L14. The third lens group G3 and the fourth lens group G4 includes therebetween, in order from the object side to the image side, an adjustment filter ND and an aperture stop AD. The fourth lens group G4 and the image surface includes therebetween a filter FG.

The first to fourth lens groups G1 to G4 are appropriately supported by common supporting frames, respectively. The aperture stop AD and the fourth lens group G4 integrally operate. FIG. 13 illustrates a surface number of each optical surface.

When changing a magnification from the wide-angle end (short focal length end) to the telephoto end (long focal length end), the first lens group G1 and the fourth lens group G4 are fixed while the second lens group G2 and the third lens group G3 move.

The detailed configuration of the zoom lens unit according to Embodiment 4 illustrated in FIG. 13 will be described.

The first lens group G1 includes, in order from e object side to the image side, the first lens L1 having a concave surface on the image side, a diffractive-optical element including a resin layer made of a thin resin material, the second lens L2 made of a biconvex lens in which an absolute value of a curvature radius on the object side surface is smaller than that on the image side surface, and the third lens L3 made of a positive meniscus lens having a convex surface on the object side. The first lens L1 and the second lens L2 are cemented through the resin layer to form a cemented lens. In this case, a diffraction surface is formed in a boundary surface of the resin layer. The cemented first lens L1, resin layer, and second lens L2 constitute a cemented lens as a diffractive-optical element.

The second lens group G2 includes, in order from the object side to the image side, the fourth lens L4 made of a biconcave lens in which an absolute value of a curvature radius on the image side surface is smaller than at on the object side surface, a fifth lens L5 made of a positive meniscus lens having a convex surface on the object side, and a sixth lens L6 made of a negative meniscus lens having a concave surface on the image side. The fifth lens L5 and the sixth lens L6 are cemented to form a cemented lens of the two lenses.

The third lens group G3 includes, in order from the object side to the image side, the seventh lens L7 made of a biconcave lens in which an absolute value of a curvature radius on the image side surface is smaller than that on the object side surface, and the eighth lens L8 made of a positive meniscus lens having a convex surface on the object side. The seventh lens L7 and the eighth lens L8 are cemented to form a cemented lens of the two lenses.

The adjustment filter ND made of a filter for adjusting a light volume such as a parallel plate ND (intermediate concentration) darkening filter is arranged between the third lens group G3 and the fourth lens group G4. The aperture stop AD is arranged between the adjustment filter ND and the fourth lens group G4.

The fourth lens group G4 includes, in order from the object side to the image side, the ninth lens L9 made of a biconvex lens in which an absolute value of a curvature radius on the image side surface is smaller than that on the object side surface, the tenth lens L10 made of a biconvex lens in which an absolute value of a curvature radius on the object side surface is smaller than that on the image side surface, the eleventh lens L11 made of a biconvex lens in which an absolute value of a curvature radius on the object side surface is smaller than that on the image side surface, the twelfth lens L12 made of a biconcave lens in which an absolute value of a curvature radius on the image side surface is equal to that on the object side surface, the thirteenth lens L13 made of a biconcave lens in which an absolute value of a curvature radius on the image side surface is smaller than that on the object side surface, and the fourteenth lens L14 made of a biconvex lens in which an absolute value of a curvature radius on the object side surface is smaller than that on the image side surface.

The eleventh lens L11 and the twelfth lens L12 are cemented to form a cemented lens of the two lenses. The thirteenth lens L13 and the fourteenth lens L14 are cemented to form a cemented lens of the two lenses.

The filter FG such as various optical filters of parallel plates or a cover glass of a light-receiving element is arranged on the optical path on the image surface side of the fourth lens group G4.

Additionally, the fourth lens group G4 includes a fourth front lens group G4F and a fourth latter lens group G4R. The fourth front lens group G4F includes the ninth lens L9. The fourth latter lens group G4R includes the tenth lens L10 to the fourteenth lens L14.

In this case, as illustrated in FIG. 13. Mien changing a magnification from the wide-angle end (short focal length end) to the telephoto end (long focal length end), the first lens group G1 and the fourth lens group G4 are fixed. The second lens group G2 and the third lens group G3 move along a trajectory as illustrated in the figure from the wide-angle end (short focal length end) to the telephoto end (long focal length end).

In Embodiment 4, when zooming is carried out, the focal length f of the entire optical system changes from 17.1 to 488, the F-number changes from 4.03 to 6.96, and the half-field angle w changes from 15.9 to 0.529. Optical characteristics of each optical element are shown in the following Table 10.

In Table 10, the optical surface shown by the surface number with * (asterisk) is a diffraction surface. Table 10 shows a material of each lens.

In other words, in Table 10, the third surface with * is a diffraction surface, and the parameters of the diffraction surface in the condition (16) are as follows.

In this case. $C_2$ represents a coefficient of 2nd order in a phase function of the diffraction surface, and $C_4$ represents a coefficient of 4th order in a phase function of the diffraction surface.

Diffraction Surface: Third Surface $\lambda = 587.56$ (nm)

$C_2 = -2.14395 \times 10^{-5}$ $C_4 = 1.30209 \times 10^{-9}$

In Embodiment 4, when zooming is carried out from the wide-angle end (short focal length end) to the telephoto end (long focal length end) through the intermediate focal length, the focal length f of the entire optical system, a variable interval DA between the first lens group G1 and the second lens group G2, a variable interval DB between the second lens group G2 and the third lens group G3, and a variable interval DC between the third lens group G3 and the adjustment filter ND change as shown in the following Table 11.

TABLE 10 f = 17.1-488, F = 4.03-6.96, ω = 15.9-0.529

| SURFACE NUMBER | r | d | nd | $v_d$ | $\theta_{C,A}'$ | NAME OF GLASS TYPE | | |
|---|---|---|---|---|---|---|---|---|
| 01 | 144.698 | 2.50 | 1.83400 | 37.16 | 0.3245 | OHARA S-LAH60 | L1 | G1 |
| 02 | 76.296 | 0.10 | 1.64310 | 38.82 | 0.3124 | RESIN MATERIAL | | |
| 03* | 76.296 | 0.10 | 1.61505 | 26.54 | 0.2831 | RESIN MATERIAL | | |
| 04 | 76.296 | 10.77 | 1.48749 | 70.24 | 0.3633 | OHARA S-FSL5 | L2 | |
| 05 | −4656.674 | 0.20 | | | | | | |
| 06 | 73.917 | 10.33 | 1.43875 | 94.94 | 0.3529 | OHARA S-FPL53 | L3 | |
| 07 | 1269.315 | VARIABLE (DA) | | | | | | |
| 08 | −159.843 | 2.00 | 1.59522 | 67.73 | 0.3431 | OHARA S-FPM2 | L4 | G2 |
| 09 | 37.759 | 0.77 | | | | | | |
| 10 | 37.285 | 6.50 | 1.80000 | 29.84 | 0.3117 | OHARA S-NBH55 | L5 | |
| 11 | 419.476 | 2.00 | 1.70000 | 48.08 | 0.3414 | OHARA S-LAM51 | L6 | |
| 12 | 33.103 | VARIABLE (DB) | | | | | | |
| 13 | −50.190 | 1.50 | 1.60300 | 65.44 | 0.3498 | OHARA S-PHM53 | L7 | G3 |
| 14 | 19.056 | 2.81 | 1.85026 | 32.27 | 0.3145 | OHARA S-LAH71 | L8 | |
| 15 | 34.804 | VARIABLE (DC) | | | | | | |
| 16 | ∞ | 1.00 | 1.51633 | 64.14 | | FILTER (ND) | | |
| 17 | ∞ | 0.90 | | | | | | |
| 18 | APERTURE | 3.50 | | | | APERTURE (AD) | | |
| 19 | 71.980 | 3.52 | 1.49700 | 81.54 | 0.3501 | OHARA S-FPL51 | L9 | G4F |
| 20 | −74.980 | 1.70 | | | | | | |
| 21 | 47.617 | 3.69 | 1.49700 | 81.54 | 0.3501 | OHARA S-FPL51 | L10 | G4R |
| 22 | −120.324 | 0.20 | | | | | | |
| 23 | 36.819 | 4.81 | 1.49700 | 81.54 | 0.3501 | OHARA S-FPL51 | L11 | |
| 24 | −36.819 | 1.50 | 1.83400 | 37.16 | 0.3245 | OHARA S-LAH60 | L12 | |
| 25 | 36.819 | 2.16 | | | | | | |
| 26 | −61.926 | 1.50 | 1.48749 | 70.24 | 0.3633 | OHARA S-FSL5 | L13 | |
| 27 | 20.000 | 5.91 | 1.54072 | 47.23 | 0.3353 | OHARA S-TIL2 | L14 | |
| 28 | −36.752 | 64.510 | | | | | | |
| 29 | ∞ | 3.50 | 1.51633 | 64.14 | | FILTER | FG | |
| 30 | ∞ | 1.000 | | | | | | |

TABLE 11

VARIABLE INTERVAL

|  | WIDE-ANGLE END | INTERMEDIATE FOCAL LENGTH | TELE-PHOTO END |
| --- | --- | --- | --- |
| FOCAL LENGTH | f = 17.09 | f = 91.37 | f = 487.5 |
| DA | 5.980 | 76.680 | 91.802 |
| DB | 67.924 | 6.164 | 46.118 |
| DC | 67.116 | 58.176 | 3.100 |

In Embodiment 4, when zooming is carried out from the wide-angle end (short focal length end) to the telephoto end (long focal length end) through the intermediate focal length, the focal length f of the entire optical system, a magnification of the second lens group G2, a magnification of the third lens group G3, a magnification of the fourth lens group G4 change as shown in the following Table 12.

TABLE 12

MAGNIFICATION OF EACH LENS GROUP

|  | WIDE-ANGLE END | INTERMEDIATE FOCAL LENGTH | TELE-PHOTO END |
| --- | --- | --- | --- |
| FOCAL LENGTH | f = 17.09 | f = 91.37 | f = 487.5 |
| SECOND LENS GROUP | −0.737 | 226.9 | 3.383 |
| THIRD LENS GROUP | 0.209 | −0.00363 | −1.298 |
| FOURTH LENS GROUP | −0.767 | −0.766 | −0.767 |

In this case, the values corresponding to the conditions (1) to (15) are as follows, and fulfill the conditions (1) to (15).
Value of Condition $|M_{2W} \cdot M_{3W} \cdot M_{4W}| = 0.118$ (1):

$|1 - M_{4W}^2| = 0.412$ (2):

$|(1 - M_{4FW}^2) \cdot M_{4FW}^2| = 0.488$ (FOURTH FRONT LENS GROUP; SURFACE NUMBER 19~20) (3):

$|1 - M_{4RW}^2| = 0.900$ (FOURTH LATTER LENS GROUP: SURFACE NUMBER 21-28) (4):

$\alpha = 131 \times 10^{-7}/^\circ C.$ (OHARA S-FPL51) (5):

$dn/dt = -6.2 \times 10^{-6}/^\circ C.$ (OHARA S-FPL51) (6):

$\nu_d = 81.51$ (L9–L11) (7):

$\theta_{C,A} - 0.000667 \cdot \nu_3 = 0.2957$ (L9–L11) (8):

$L_4/T_{4F-I} = 0.268$ (9):

$f_T/f_{DOE} = 0.0209$ (10):

$\nu_{1GP} = 82.6$ (11):

$f_1/f_W = 8.46$ (12):

$f_2/f_W = -3.04$ (13):

$f_3/f_W = -2.48$ (14):

$f_4/f_W = 2.78$ (15):

A change in focus position at the wide-angle end with a temperature change of the zoom lens unit from 20° C. to 70° C. is +0.277 mm, a displacement of the fourth lens group required for correcting the change in focus position is 0.672 mm toward the object side, a displacement of the fourth front lens group is 0.568 mm toward the image side, and a displacement of the fourth latter lens group is 0.308 mm toward the object side.

Figure 14:
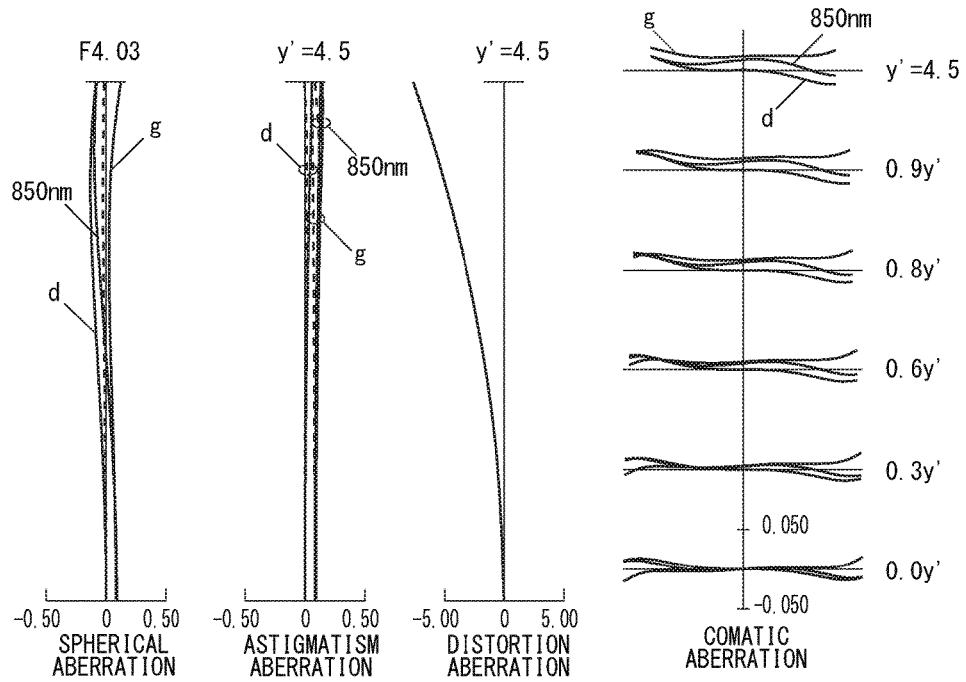
FIG. 14 shows graphs illustrating curves of spherical aberration, astigmatism aberration, distortion aberration, and coma aberration at the wide-angle end of the zoom lens unit according to Embodiment 4 illustrated in FIG. 13.
Figure 15:
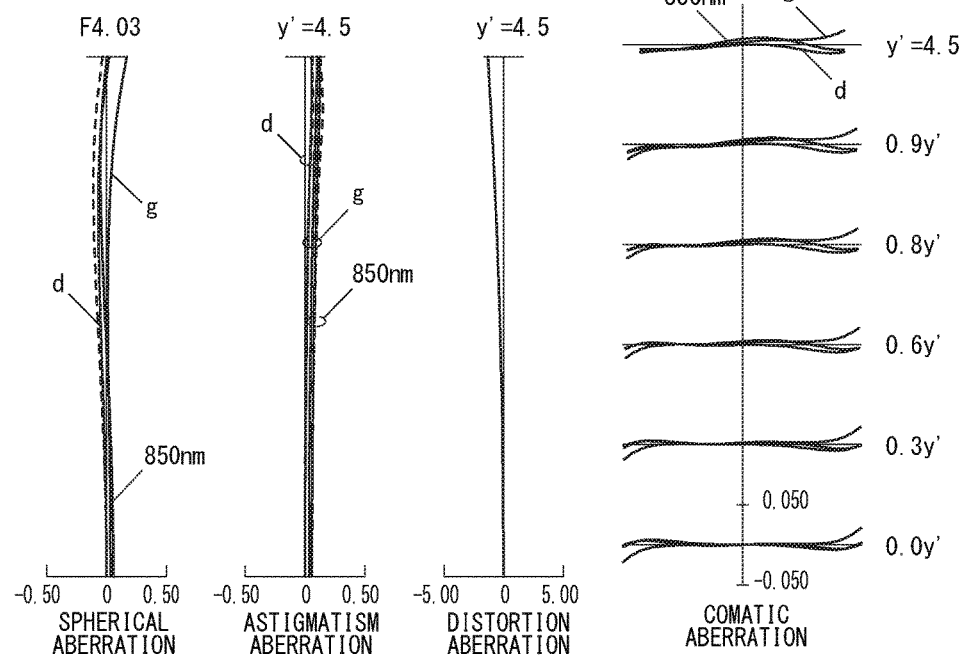
FIG. 15 shows graphs illustrating curves of spherical aberration, astigmatism aberration, distortion aberration, and coma aberration at the intermediate focal length of the zoom lens unit according to Embodiment 4 illustrated in FIG. 13.
Figure 16:
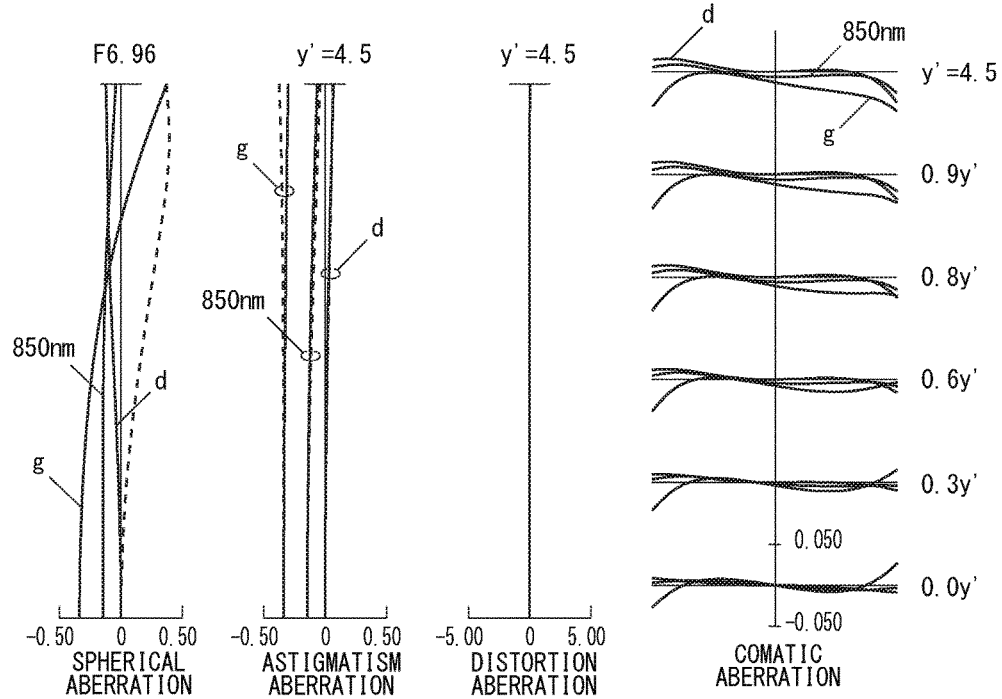
FIG. 16 shows graphs illustrating curves of spherical aberration, astigmatism aberration, distortion aberration, and coma aberration at the telephoto end of the zoom lens unit according Embodiment 4 illustrated in FIG. 13.

FIGS. 14, 15, 16 respectively show spherical aberration graphs, astigmatism aberration graphs, distortion aberration graphs, and coma aberration graphs at the wide-angle end, at the intermediate focal length, and at the telephoto end of the zoom lens unit according to Embodiment 4, In the drawings, dashed lines in the spherical aberration graphs represent a sine condition, solid lines in the astigmatism aberration graphs represent sagittal aberration, and dashed lines in the astigmatism aberration graphs represent meridional aberrations. Note that aberration graphs for other Embodiments are drawn in the same manner.

Embodiment 5

Finally, an imaging device according to Embodiment 5 will be described with reference to FIG. 17.

Figure 17:
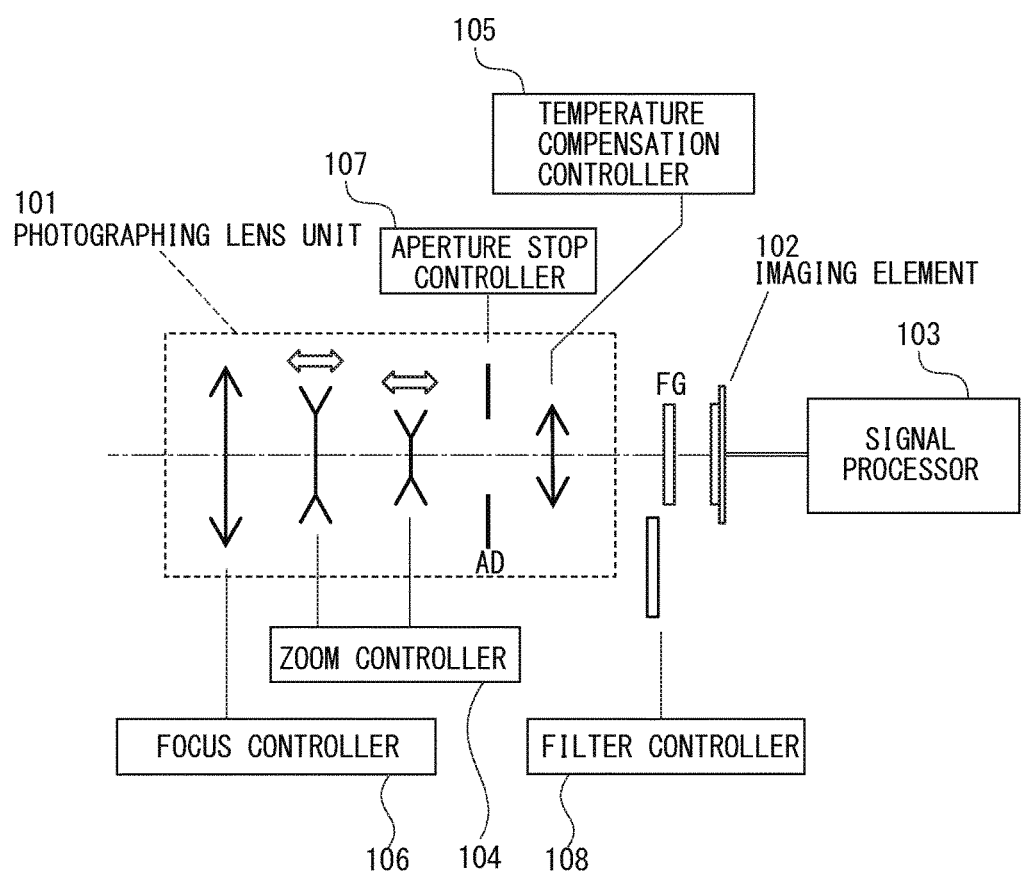
FIG. 17 is a function block diagram of a digital camera as an imaging device according to Embodiment 5.

The imaging device illustrated in FIG. 17 includes a photographing lens unit 101 and an imaging element (area sensor) 102. The imaging device is configured to photoelectrically convert an image of a photographing object formed on the imaging element 102 by the photographing lens 101 to read as an image signal. The zoom lens unit described above is used as the photographing lens unit 101.

The image signal output from the imaging element 102 is processed in the signal processor 103, and is converted into digital information. The image information digitalized by the signal processor 103 receives a predetermined image process in a not-shown image processor, is recorded in a not-shown semiconductor memory, and is transferred outside with a not-shown communication unit. The image during shooting can be displayed on a not-shown monitor, or the image recorded in a semiconductor memory, etc. can be displayed on a not-shown monitor.

The zoom lens unit carries out a zoom operation by a zoom controller 104, and carries out a focus operation by a focus controller 106. F-number can be controlled by changing a diameter of the aperture stop AD with an aperture stop controller 107, or a switching operation of an infrared light cut filter and a visible light cut filter can be carried out by a filter controller 108.

A temperature compensation operation by the movement of the entire or a part of the fourth lens group G4 is carried out with a temperature compensation controller 105 having a temperature sensor. The movement position by a temperature (displacement according to unit change in temperature) is previously obtained by calculation or measurement, and is recorded in the temperature compensation controller 105.

Additionally, a certain level of error is allowed as a result of the temperature compensation by the movement of the entire or a part of the fourth lens group G4. This is because a slight error of a focus position can be recovered by the focus function of the first lens group G1 even at the wide-angle end.

The imaging device or a monitoring video camera can be achieved by using the above-described zoom lens unit for the photographing lens unit 101 as the imaging optical system.

Therefore, it is possible to provide a high quality compact imaging device or monitoring camera having a magnification exceeding 25 times and using an imaging element of 2,000,000 pixels or more.

According to the embodiments of the present invention, it becomes possible to provide a zoom lens unit in which the magnification exceeds 25 times, the chromatic aberration is sufficiently corrected from the visible light range to the near-infrared light range, the resolving power is compatible with the imaging element of 2,000,000 pixels or more, and a change in focus position with a temperature change can be effectively corrected especially in the wide-angle range. Thus, it becomes possible to provide a high magnification imaging device or monitoring video camera in which a difference of focus positions from the visible light range to the near-infrared light range is small, the high image quality is maintained, and out of focus with a temperature change does not occur.

According to the embodiments of the present invention, it becomes possible to provide a specific device for providing a zoom lens unit in which a change in focus position with a temperature change can be effectively corrected especially in the wide-angle end. Thus, it becomes possible to provide a high magnification imaging device in which a difference of focus positions from the visible light range to the near-infrared light range is small, the high image quality is maintained, and out of focus with a temperature change does not occur.

According to the embodiments of the present invention, it becomes possible to provide a zoom lens unit in which the fourth lens group effectively showing the configuration of the present invention is shown, the degree of freedom of the chromatic aberration correction is ensured, and the chromatic aberration is corrected with high accuracy from the visible light range to the near-infrared light range. Thus, it becomes possible to provide a high quality imaging device or monitoring video camera in which a difference of focus positions from the visible light range to the near-infrared light range is small.

According to the embodiments of the present invention, it becomes possible to provide a high-performance zoom lens unit in which the chromatic aberration is further preferably corrected from the visible light range to the near-infrared light range. Thus, it becomes possible to provide a high quality imaging device or monitoring video camera.

According to the embodiments of the present invention, it becomes possible to provide a high-performance zoom lens unit in which the fourth lens group is appropriately arranged to the image surface and a mechanism for correcting a focus position can be easily achieved. Thus, it becomes possible to provide a high quality imaging device or monitoring video camera without complicating various mechanisms.

The embodiments of the present invention illustrate an appropriate configuration example for further preferably correcting the chromatic aberration especially in the telephoto range. According to the embodiments of the present invention, the zoom lens unit of the present invention can be realized.

The embodiments of the present invention illustrate an appropriate configuration example of the fourth lens group, which preferably corrects the chromatic aberration in the telephoto range. According to the embodiments of the present invention, a high-performance zoom lens unit can be provided.

According to the embodiments of the present invention, an imaging device or a monitoring video camera using the zoom lens in which the magnification exceeds 25 times or more, the chromatic aberration is preferably corrected from the visible light range to the near-infrared light range, the resolving power is compatible with the imaging element of 2,000,000 pixels or more, and a change in focus position with a temperature change can be effectively corrected especially in the wide-angle range as the optical system for photographing. Thus, a user performs imaging from the visible light range to the near-infrared light range with no stress.

Although the embodiments of the present invention have been described above, the present invention is not limited thereto. It should be appreciated that variations may be made in the embodiments described by persons skilled in the art without departing from the scope of the present invention.

What is claimed is:

1. A zoom lens system comprising, in order from an object side to an image side:
    a first lens group having positive refractive power and a focus function;
    a second lens group having negative refractive power, which moves when changing a magnification;
    a third lens group which moves when changing a magnification; and
    a fourth lens group having positive refractive power, which is fixed when changing a magnification, wherein the following condition (1) is fulfilled:

$$|M_{2W} \cdot M_{3W} \cdot M_{4W}| < 0.14 \tag{1}$$

where $M_{2W}$ represents an imaging magnification of the second lens group at a wide-angle end, $M_{3W}$ represents an imaging magnification of the third lens group at the wide-angle end, and $M_{4W}$ represents an imaging magnification of the fourth lens group at the wide-angle end,
    the fourth lens group includes, in order from the object side, three positive lenses, and
    each of the three positive lenses fulfills the following conditions (7), (8):

$$75 < v_d < 96 \tag{7}$$

$$\theta_{C,A'} < 0.000667 \cdot v_d + 0.300 \tag{8}$$

where vd represents Abbe number of a lens material, and $\theta_{C,A'}$ represents a partial dispersion ratio of the lens material, in this case, $\theta_{C,A'} = (n_C - n_{A'})/(n_F - n_C)$, and $n_F$, $n_C$, $n_{A'}$ are refractive indexes relative to F-line, C-line and A'-line of the lens material, respectively.

2. The zoom lens system according to claim 1, wherein a change in focus position with a temperature change is corrected by moving the entire fourth lens group, and the following condition (2) is fulfilled:

$$0.3 < |1 - M_{4W}^2| < 1.5 \tag{2}$$

where $M_{4W}$ represents the imaging magnification of the fourth lens group at the wide-angle end.

3. The zoom lens system according to claim 1, wherein the fourth lens group includes, in order from the object side, a fourth front lens group and a fourth latter lens group,
    a change in focus position with a temperature change is corrected by moving the fourth front lens group while maintaining the fourth latter lens group stationary, and the following condition (3) is fulfilled:

$$0.3 < |(1 - M_{4FW}^2) \cdot M_{4RW}^2| < 1.5 \tag{3}$$

where $M_{4FW}$ represents an imaging magnification of the fourth front lens group at the wide-angle end and $M_{4RW}$ represents an imaging magnification of the fourth latter lens group at the wide-angle end.

4. The zoom lens system according to claim 1, wherein the fourth lens group includes, in order from the object side, a fourth front lens group and a fourth latter lens group, a change in focus position with a temperature change is corrected by moving the fourth latter lens group while maintaining the fourth front lens group stationary, and the following condition (4) is fulfilled:

$$0.3 < |1 - M_{4RW}^2| < 1.5 \quad (4)$$

where $M_{4RW}$ represents an imaging magnification of the fourth latter lens group at the wide-angle end.

5. The zoom lens system according to claim 1, wherein the fourth lens group includes a plurality of positive lenses with each of the positive lenses fulfilling the following conditions (5), (6):

$$\alpha > 110 \times 10^{-7}/°\text{ C.} \quad (5)$$

$$dn/dt < -4 \times 10^{-6}/°\text{ C.} \quad (6)$$

where α is a linear expansion coefficient of a lens material in a temperature range including 20° C., and dn/dt represents a temperature coefficient of a relative refractive index of a lens material in a range from 20° C. to 40° C.

6. The zoom lens system according to claim 1, wherein the following condition (9) is fulfilled:

$$0.2 < L_4/T_{4F-I} < 0.5 \quad (9)$$

where $L_4$ represents a distance along an optical axis from a most object side surface to a most image side surface in the fourth lens group, and $T_{4F-I}$ represents a distance along an optical axis from the most object side surface of the fourth lens group to an image surface, and when an optical element without having refractive power is provided on the image side of the fourth lens group, $T_{4F-I}$ also represents an air conversion length assuming that there is no optical element.

7. The zoom lens system according to claim 1, wherein the fourth lens group comprises six lenses including, in order from the object side, a first positive lens, a second positive lens, a third positive lens, a first negative lens, a second negative lens, and a fourth positive lens.

8. The zoom lens system according to claim 3, wherein the fourth lens group comprises six lenses including, in order from the object side, a first positive lens, a second positive lens, a third positive lens, a first negative lens, a second negative lens, and a fourth positive lens,
the fourth front lens group consists of the first positive lens, and
the fourth latter lens group comprises five lenses from the second positive lens to the fourth positive lens.

9. An imaging device comprising the zoom lens system according to claim 1 as an optical system for photographing.

10. A monitoring video camera comprising the zoom lens system according to claim 1 as an optical system for photographing.

11. A zoom lens system comprising, in order from an object side to an image side:
a first lens group having positive refractive power and a focus function;
a second lens group having negative refractive power, which moves when changing a magnification;
a third lens group which moves when changing a magnification; and
a fourth lens group having positive refractive power, which is fixed when changing a magnification, wherein
the following condition (1) is fulfilled:

$$|M_{2W} M_{3W} M_{4W}| < 0.14 \quad (1)$$

where $M_{2W}$ represents an imaging magnification of the second lens group at a wide-angle end, $M_{3W}$ represents an imaging magnification of the third lens group at the wide-angle end, and $M_{4W}$ represents an imaging magnification of the fourth lens group at the wide-angle end, and
the fourth lens group includes a plurality of positive lenses with each of the positive lenses fulfilling the following conditions (5), (6):

$$\alpha > 110 \times 10^{-7}/°\text{ C.} \quad (5)$$

$$dn/dt < -4 \times 10^{-6}/°\text{ C.} \quad (6)$$

where α is a linear expansion coefficient of a lens material in a temperature range including 20° C., and dn/dt represents a temperature coefficient of a relative refractive index of a lens material in a range from 20° C. to 40° C.

* * * * *